US007751664B2

United States Patent
Ieda et al.

(10) Patent No.: US 7,751,664 B2
(45) Date of Patent: Jul. 6, 2010

(54) DOOR HANDLE APPARATUS FOR VEHICLE

(75) Inventors: Kiyokazu Ieda, Kariya (JP); Yuichi Murakami, Chiryu (JP); Hiroki Okada, Toyota (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 12/412,198

(22) Filed: Mar. 26, 2009

(65) Prior Publication Data

US 2009/0279826 A1  Nov. 12, 2009

(30) Foreign Application Priority Data

May 8, 2008  (JP) .............. 2008-122586

(51) Int. Cl.
G02B 6/30 (2006.01)
G02B 6/00 (2006.01)
G01J 1/04 (2006.01)
G01J 1/42 (2006.01)
B60Q 1/56 (2006.01)

(52) U.S. Cl. .............. 385/49; 385/31; 385/88; 385/92; 385/134; 385/147; 250/216; 250/227.11; 250/227.14; 250/227.31; 250/221; 250/239; 362/551; 362/559; 362/459; 362/487; 362/501; 362/509; 362/511; 362/543; 362/544

(58) Field of Classification Search ........... 385/49; 250/227.14; 362/501, 511
See application file for complete search history.

(56) References Cited

U.S. PATENT DOCUMENTS 5,465,194 A * 11/1995 Currie .............. 362/464
6,239,693 B1 * 5/2001 Benard et al. ......... 340/426.26
6,648,493 B2 * 11/2003 Klein .............. 362/501
6,949,882 B2 * 9/2005 Suyama et al. ............ 315/77

(Continued)

FOREIGN PATENT DOCUMENTS

DE  198 13 782 C1  5/1999

(Continued)

OTHER PUBLICATIONS

Search Report issued Sep. 7, 2009 in corresponding European Application No. 09156733.9.

Primary Examiner—Ryan Lepisto
(74) Attorney, Agent, or Firm—Buchanan Ingersoll & Rooney PC

(57) ABSTRACT

A door handle apparatus for a vehicle, opening and closing a vehicle door, the door handle apparatus includes an informing portion for visually informing a state of the vehicle door, including a locking/unlocking state thereof, to a user by a decorative light, which is a visible light, an operation detecting portion for optically detecting an active-direct operation to the door handle apparatus by the user based on changes in an detection light, and an optical waveguide for transmitting the decorative light and the detection light, which is inputted from a first end portion of the optical waveguide, to a second end portion of the optical waveguide, the optical waveguide functioning as the informing portion by leaking the decorative light on a transmission path so as to be outwardly emitted and as the operation detecting portion by outputting the detection light from the second end portion of the optical waveguide.

13 Claims, 11 Drawing Sheets

U.S. PATENT DOCUMENTS

| | | |
|---|---|---|
| 2003/0031025 A1* | 2/2003 | Huizenga .................... 362/501 |
| 2003/0095416 A1* | 5/2003 | Huizenga .................... 362/501 |
| 2004/0075531 A1* | 4/2004 | Ieda et al. ................... 340/5.72 |
| 2004/0223336 A1* | 11/2004 | Murakami et al. .......... 362/501 |
| 2005/0047162 A1* | 3/2005 | Baek .......................... 362/501 |
| 2005/0073804 A1 | 4/2005 | Maruyama et al. |
| 2005/0285717 A1* | 12/2005 | Ieda et al. ................... 340/5.72 |
| 2007/0171057 A1* | 7/2007 | Ogino et al. ............... 340/545.7 |
| 2008/0290668 A1* | 11/2008 | Ieda et al. ................... 292/198 |

FOREIGN PATENT DOCUMENTS

| | | |
|---|---|---|
| DE | 198 09 716 A1 | 9/1999 |
| DE | 100 39 685 A1 | 2/2002 |
| DE | 10 2006 019 284 A1 | 10/2007 |
| EP | 1 609 674 A1 | 12/2005 |
| GB | 2 336 625 A | 10/1999 |
| JP | 2004-175252 A | 6/2004 |

* cited by examiner

FIG. 14
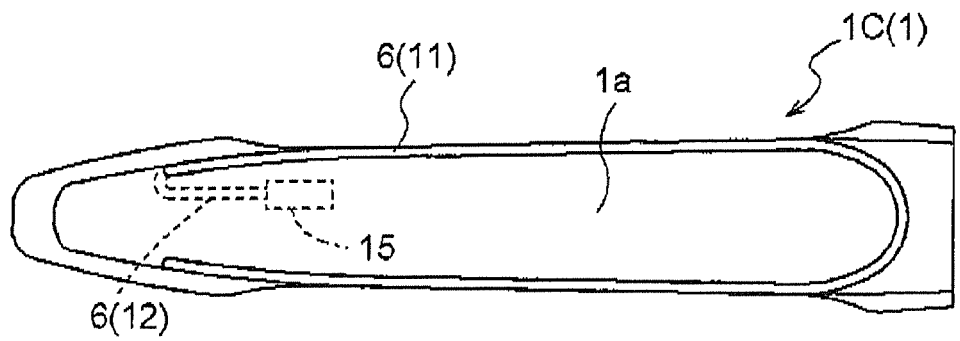
FIG. 15A  FIG. 15B
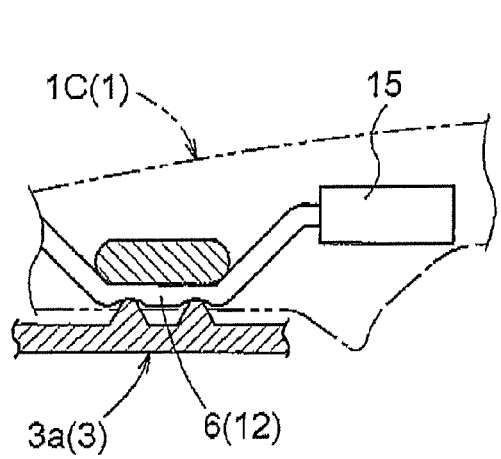 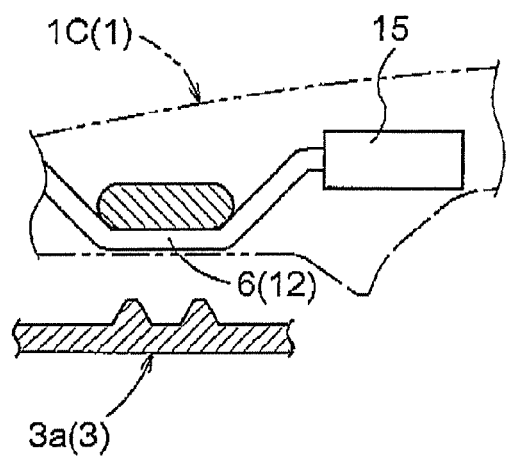
FIG. 16
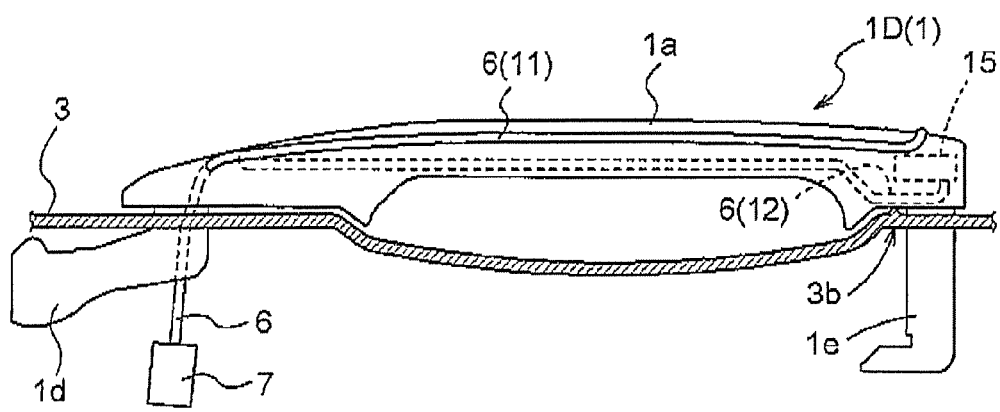

DOOR HANDLE APPARATUS FOR VEHICLE

CROSS REFERENCE TO RELATED APPLICATIONS

This application is based on and claims priority under 35 U.S.C. §119 to Japanese Patent Application 2008-122586, filed on May 8, 2008, the entire contents of which is incorporated herein by reference.

FIELD OF THE INVENTION

The present invention relates to a door handle apparatus for a vehicle. More specifically, the present invention pertains to a door handle apparatus, which is provided at a vehicle door, for opening/closing the vehicle door by an operation of a user.

BACKGROUND

There exists a known locking system (a smart entry system) for controlling a vehicle door to be automatically locked or unlocked by establishing communication between a portable device carried by a user and a main unit, which is provided at a vehicle, for conducting an authentication (identification) of the potable device. In such locking system, there exists a known locking system for unlocking the door after detecting an operation to a door handle by the user, such as contact of the user to the door handle, which is provided at the vehicle door, in a perspective of security against unlocking of the door immediately after the authentication of the portable device. In this case, the locking system may preferably be configured so that the user is notified whether or not the vehicle door is in a state of waiting for an operation by the user (i.e. a state of waiting for an order for unlocking) on the basis of the authentication result of the portable device (i.e. in a case where the portable device is authenticated). For example, even if the user contacts the door handle in a case where the portable device is not authenticated, the vehicle door will not be unlocked. Accordingly, in this case, the user still needs to unlock the door by using a remote controller or a mechanical key, which may result in deteriorating convenience of the locking system. Further, the user may need to check whether or not the vehicle door is locked every time when the user locks the door, which also may result in deteriorating convenience of the locking system. Accordingly, the convenience of the locking system may be deteriorated if the user is not capable of easily checking the locking/unlocking state of the vehicle door, an authentication state of the portable device and the like.

Disclosed in JP2004-175252A is a lighting control device for lighting a lamp in response to a condition, such as an establishment of communication between a main unit and a portable device, and the like. According to the lighting control device disclosed in JP2004-175252A, a user perceives a vehicle identification, the locking/unlocking state of the vehicle door and the like by the lighting control device changing lighting (i.e. continuous lighting, flashing, changing colors of lighting and the like) in response to an establishing state of the communication between the main unit and the portable device. However, a door handle disclosed in JP2004-175252A does not include a detecting portion for detecting an active-direct operation to the vehicle door by the user, such as a contact to the door handle by the user and the like. As described above, in the perspective of security, it may be preferable to unlock the vehicle door after detecting the active-direct operation to the vehicle door, in addition to the authentication of the portable device.

Disclosed in U.S. Pat. No. 6,239,693 B1 is a security system for a motor vehicle opening leaf, which detects whether or not an active-direct operation to a door handle is conducted by a user. According to the security system for the motor vehicle opening leaf, a vehicle door includes an emitter for emitting a signal of an electromagnetic type to the door handle and a receiver for receiving a signal reflected by the door handle. When a hand of the user is inserted into a space formed between the vehicle door and the door handle, the signal to be received by the receiver is interrupted, thereby detecting the active-direct operation to the door handle by the user. Additionally, according to the security system for the motor vehicle opening leaf, it is disclosed that a light signal in a visible range or in an infrared range may be used as the signal.

In the security system for the motor vehicle, it is disclosed that the light signal in the visible range is used for detecting the active-direct operation to the door handle by the user. However, the light signal is not used for informing the user of the locking/unlocking state of the vehicle door, the authentication state of the portable device and the like. Therefore, the user may not perceive the locking/unlocking state of the vehicle door, the authentication state of the portable device and the like, which may result in deteriorating the convenience of the locking system. Furthermore, because the emitter and the receiver for detecting the active-direct operation to the door handle by the user is provided at a door panel side, the security system for the motor vehicle opening leaf has low productivity and may deteriorate ease of maintenance, which may result in increasing production costs and maintenance costs.

A need thus exists to provide a door handle apparatus for a vehicle, which is not susceptible to the drawback mentioned above.

SUMMARY OF THE INVENTION

According to an aspect of the present invention, a door handle apparatus for opening and closing a vehicle door, the door handle apparatus includes an informing portion for visually informing a state of the vehicle door, including a locking/unlocking state of the vehicle door, to a user by using a decorative light, an operation detecting portion for optically detecting an active-direct operation to the door handle apparatus by the user on the basis of changes in an detection light, and an optical waveguide for transmitting the decorative light and the detection light, which are inputted from a first end portion of the optical waveguide, to a second end portion of the optical waveguide, the optical waveguide functioning as the informing portion by leaking the decorative light on a transmission path so as to be outwardly emitted and as the operation detecting portion by outputting the detection light from the second end portion of the optical waveguide.

BRIEF DESCRIPTION OF THE DRAWINGS

The foregoing and additional features and characteristics of the present invention will become more apparent from the following detailed description considered with the reference to the accompanying drawings, wherein:

FIG. 14 is a top view of the door handle apparatus for the vehicle according to the third embodiment;

FIG. 15A is a view for explaining an example of a state of the door handle apparatus for the vehicle before the manual operation by the user is detected in the third embodiment;

FIG. 15B is a view for explaining an example of detecting the manual operation by the user in the third embodiment;

FIG. 16 is a side view of a door handle apparatus for a vehicle according to a fourth embodiment;

DETAILED DESCRIPTION

Embodiments of a door handle apparatus for a vehicle (which will be hereinafter referred to as a door handle), to which a locking system (a smart entry system) is adapted, will be described below in accordance with the attached drawings.

Figure 1:
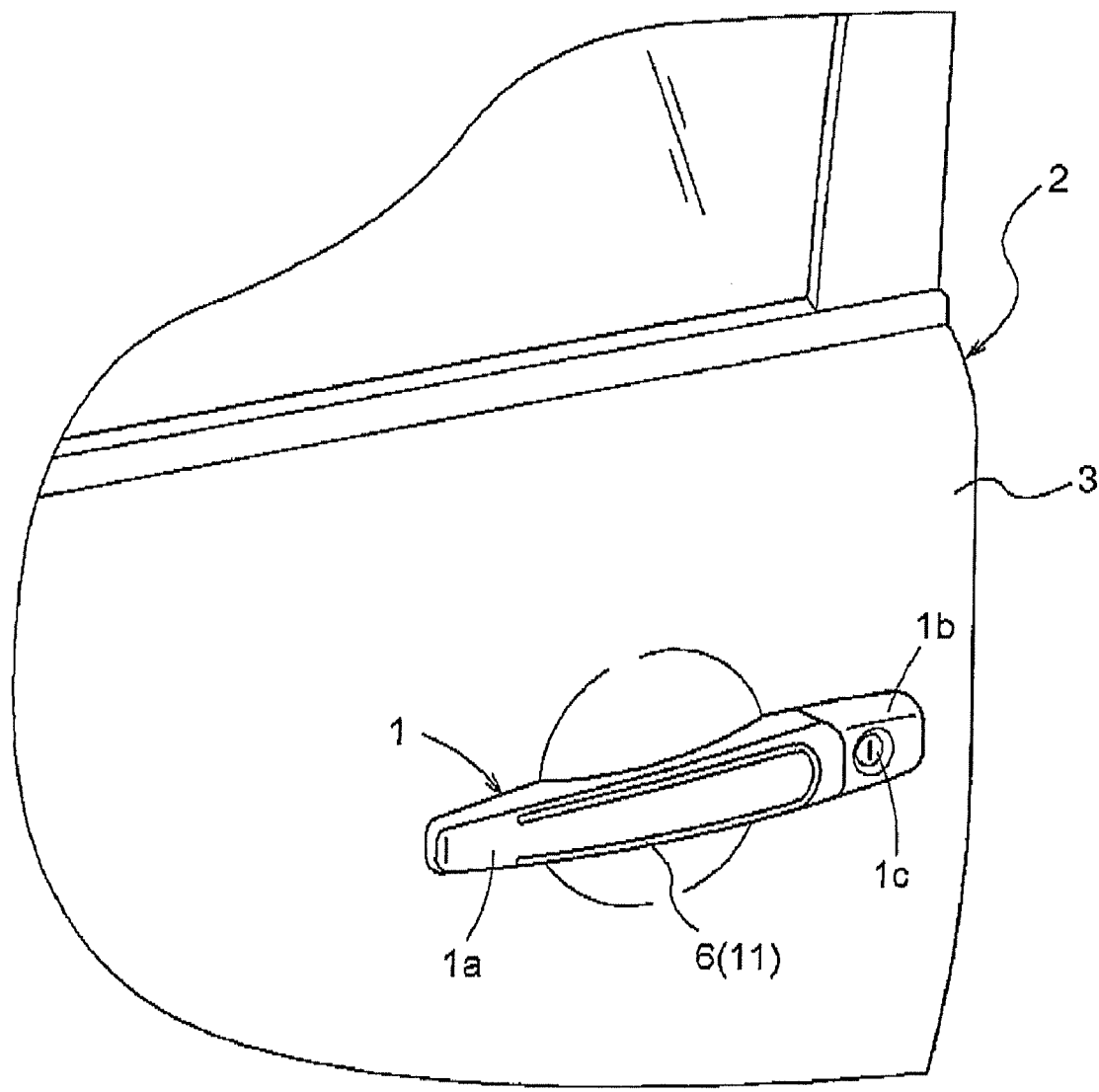
FIG. 1 is a perspective view illustrating an example of a vehicle door, to which a door handle apparatus for a vehicle is provided.
Figure 2:
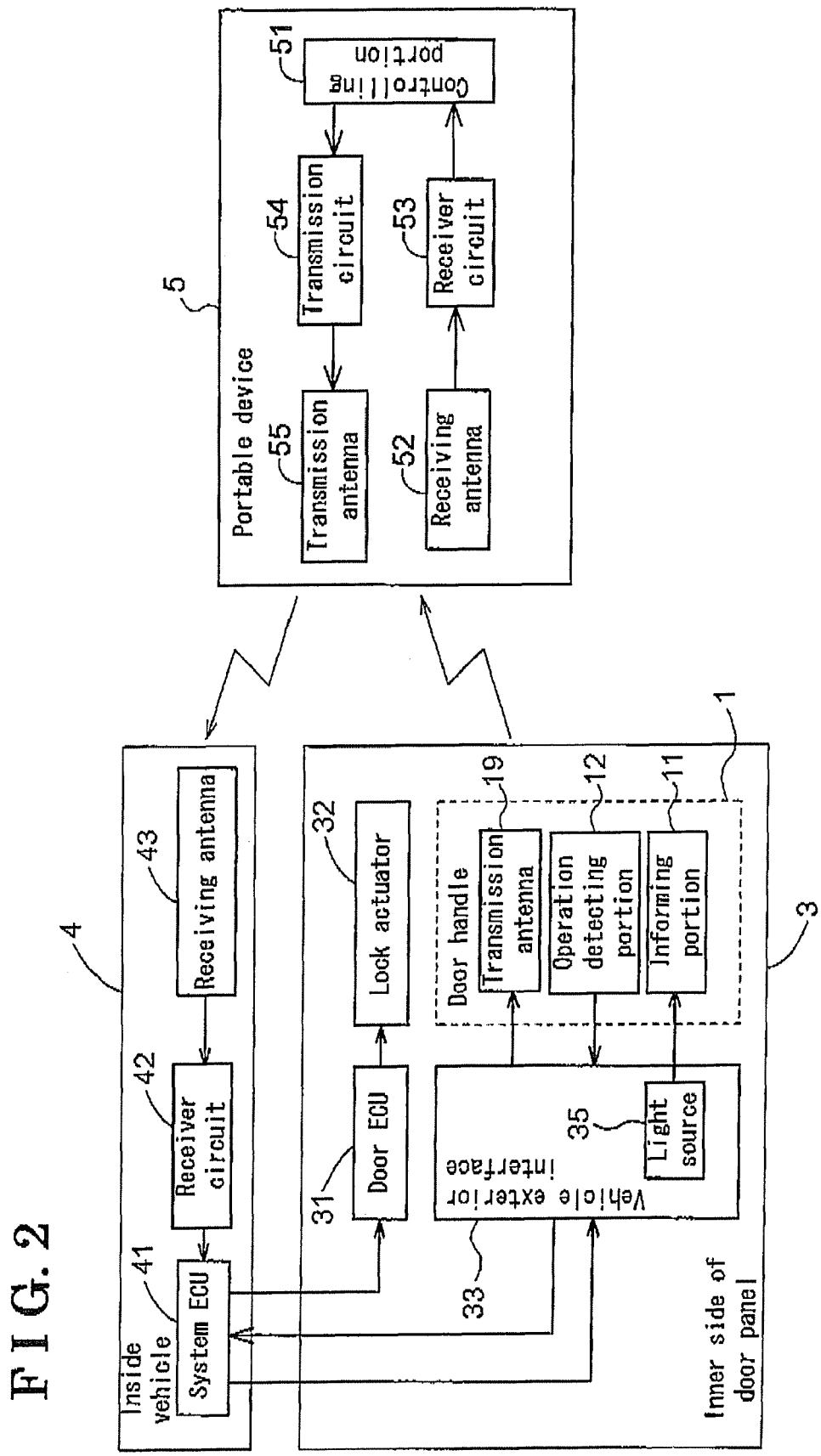
FIG. 2 is a block diagram schematically illustrating an example of a system configuration of a locking system.

A brief overview of the locking system will be given. Illustrated in FIG. 1 is a perspective view illustrating an example of a vehicle door, to which the door handle is provided. Illustrated in FIG. 2 is a block diagram schematically illustrating an example of a system configuration of the locking system. An opening/closing control for the vehicle door is also included in the locking system. However, in order to facilitate the locking system, the opening/closing control for the vehicle door is not included in the embodiments, and a system for executing a locking/unlocking control to the vehicle door will be explained as an example of the locking system.

A door handle 1 (i.e. the door handle apparatus for the vehicle) is retained by a handle frame, which is provided inside of a door panel 3 of a vehicle door 2. The door handle 1 includes a handle main body 1a and a handle cap 1b. The handle cap 1b includes a key cylinder 1c for mechanically locking/unlocking the vehicle door 2 by a manual operation of a user. A surface of the handle main body 1a of the door handle 1 facing the vehicle door 2 (the door panel 3) includes a recessed portion, so that the handle main body has a recessed surface portion. Accordingly, a clearance, into which the user's hand or finger is insertable, is formed between the handle main body 1a and the door panel 3. By forming a recessed portion on a portion of the door panel 3 facing the recessed portion of the handle main body 1a, as illustrated in FIG. 1, a sufficient clearance, into which the user's hand or finger is insertable, is formed between the door handle 1 and the door panel 3 while reducing the handle main body 1a in size.

As illustrated in FIG. 2, the locking system of the embodiments is configured with a system electronic, control unit 41 (which will be hereinafter referred to as a system ECU 41), provided at the vehicle, as a core. The system ECU 41 is configured with a microcomputer and other electronic circuits. The system ECU 41 executes authentication (identification) of a portable device 5 in a case where a user (a driver) carrying the portable device 5 approaches the vehicle. In a case where the system ECU 41 authenticates that the portable device 5 carried by the user corresponds to the portable device 5 for the vehicle, the system ECU 41 drives a lock actuator 32 via a door electronic control unit 31 (which will be hereinafter referred to as a door ECU 31) under a predetermined condition in order to unlock the vehicle door 2. The lock actuator 32 is a motor or a solenoid for actuating a lock mechanism provided at the vehicle door 2 on the basis of an electric signal transmitted to the lock actuator 32. In the embodiments, the predetermined condition refers to a predetermined active-direct operation to the handle 1. The active-direct operation refers to, for example, a contact to the door handle 1 by the user, an action of the user pulling the door handle 1, and the like. Such active-direct operation is detected by an operation detecting portion 12. The detection result is transmitted to the system ECU 41 via a vehicle exterior interface 33, provided at an inner side of the door panel 3. An example of an unlocking control executed by the locking system will be described below in order.

While the vehicle is parked in the state where the vehicle door is locked, the system ECU 41 constantly outputs a request signal to the portable device 5 towards an outside of the vehicle via the vehicle exterior interface 33, which is provided at the inner side of the door panel 3, and a transmission antenna 19, which is provided within the door handle 1. For example, a ferrite bar antenna, which is configured by winding a resonance coil on a ferrite, is adapted as the transmission antenna 19. The vehicle exterior interface 33 includes a transmission circuit, such as a modulation circuit and the like, to which the request signal is transmitted. The request signal is constantly sent towards the outside of the vehicle at predetermined intervals by a carrier wave in a low frequency band (a LF band), for example approximately 130 kHz in the LF band.

When the portable device 5 is carried into a predetermined range away from the vehicle (i.e. a predetermined range in the vicinity of the vehicle), in other words, when the portable device 5 is carried into a range of request signal coverage, a controlling portion 51 of the portable device 5 receives the request signal via a receiving antenna 52 and a receiver circuit 53. The controlling portion 51 of the portable device 5 transmits a response signal (i.e. a signal to respond to the request signal) to the vehicle via a transmission circuit 54 and a transmission antenna 55. In this case, the portable device 5 transmits the response signal, into which an identification code (ID code) of the portable device 5 is included. The response signal is transmitted towards the vehicle by a carrier wave in an ultra high frequency band (a UHF band), for example approximately 300 MHz in the UHF band.

The portable device 5 also functions as a remote controller for remote-controlling the vehicle door 2 to be locked/unlocked by a button operation and the like by the user. A locking/unlocking request signal is outputted from the portable device 5, which serves as the remote controller, by the carrier wave in the UHF band. The response signal or the locking/unlocking request signal, which is transmitted from the portable device 5, is received by a receiving antenna 43, which is provided at, for example, a door mirror of the vehicle 4, a rear-view mirror provided within the vehicle, and the like. The received response signal or the locking/unlocking signal is transmitted to the system ECU 41 via a receiver circuit 42 provided at the vehicle. The system ECU 41 executes the authentication of the portable device 5 on the basis of the ID code, which is included in the response signal or the locking/unlocking request signal transmitted from the portable device 5.

In a case where the received ID code corresponds with a preliminarily set (registered) ID code, the system ECU 41 authenticates that the portable device 5, from which the response signal or the locking/unlocking request signal is transmitted, is the portable device corresponding to the vehicle. In the case where the system ECU 41 authenticates the portable device 5 on the basis of the locking/unlocking request signal, the system ECU 41 drives the lock actuator 32 in order to lock/unlock the vehicle door 2. On the other hand, in the case where the system ECU 41 authenticates the portable device 5 on the basis of the response signal to the request signal, which is transmitted from the system ECU 41 via the vehicle exterior interface and the transmission antenna 19 provided at the vehicle door 2, the system ECU 41 awaits an order for unlocking of the vehicle door 2, i.e. the system ECU 41 turns to be in a state of awaiting an operation input by the user.

When the system ECU 41 turns to be in the state of awaiting the operation input by the user, the system ECU 41 drives a light source 35 (a light-emitting source) via the vehicle exterior interface 33 in order to optically inform the user that the system ECU 41 is in the state of awaiting the operation input by means of a decorative light, which is a visible light, via an informing portion 11. The user visually perceives a control state of the vehicle door 2 on the basis of a state of the informing portion 11. For example, a light emitting diode (LED), which outputs reds blue or yellow light whose wavelength exits in a visible region, may be used as the light source 35.

When the user carrying the portable device 5 approaches the vehicle and contacts the door handle 1, the active operation by the user is detected by the operation detecting portion 12, which is provided at the door handle 1. The detection result by the operation detecting portion 12 is transmitted to the system ECU 41 via the vehicle exterior interface 33. The system ECU 41 drives the lock actuator 32 via the door ECU 31 and unlocks the vehicle door 2. The locking system may be modified so as to directly transmit the detection result of the operation detecting portion 12 to the door ECU 31. In other words, the locking system may be modified so as to output an unlocking standby command to the door ECU 31, so that the door ECU 31 awaits an unlocking command for the vehicle door 2, i.e. so that the door ECU 31 turns to be in the state of awaiting the operation input by the user.

The control for unlocking the vehicle door 2 is described above. However, a similar control is adaptable to a control for locking the vehicle door 2. For example, a system for locking the vehicle door 2 is established so as to lock the vehicle door 2 in a case where the user carrying the portable device 5 gets out of the vehicle and performs a predetermined active operation, such as contacting the door handle 1 and the like. Even in this case, it may be preferable to notify the user whether or not the active operation for the locking is receivable at the door handle 1.

As is the case with the control for unlocking, when the system ECU 41 turns to be in the sate of awaiting the operation input by the user, the system ECU 41 drives the light source 35 via the vehicle exterior interface 33 in order to optically inform the user that the system ECU 41 is in the state of awaiting the operation input by using the decorative lights, which are the visible lights, via the informing portion 11. The user visually perceives the control state of the vehicle door 2 based on the state of the informing portion 11. When the active-direct operation to the door handle 1 is performed by the user, the system ECU 41 turns off the light source 35 after the system ECU 41 drives the lock actuator 32 via the door ECU 31 and locks the vehicle door 2. Accordingly, the decorative light is stopped being emitted from the informing portion 11, so that the user surely perceives that the vehicle door 2 is locked.

The operation detecting portion 12 is configured so as to include an optical sensor portion. A detection light used at the optical sensor portion is a light, which is transmitted towards the optical sensor portion via the informing portion 11. Generally, in a door handle apparatus having an operation detecting means for detecting the operation of the user and an optical informing means, a piezoelectric sensor, a capacitive sensor, a mechanical switch or the like is used as the operation detecting means. On the other hand, in the embodiments, the detection light is transmitted to the operation detecting portion 12 via the informing portion 11. Accordingly, because the locking system of the embodiments does not include plural transmission paths for transmitting plural signals (including lights), the door handle 1 is simplified and reduced in size. The embodiments of the door handle 1 will be described below.

First Embodiment

Figure 3:
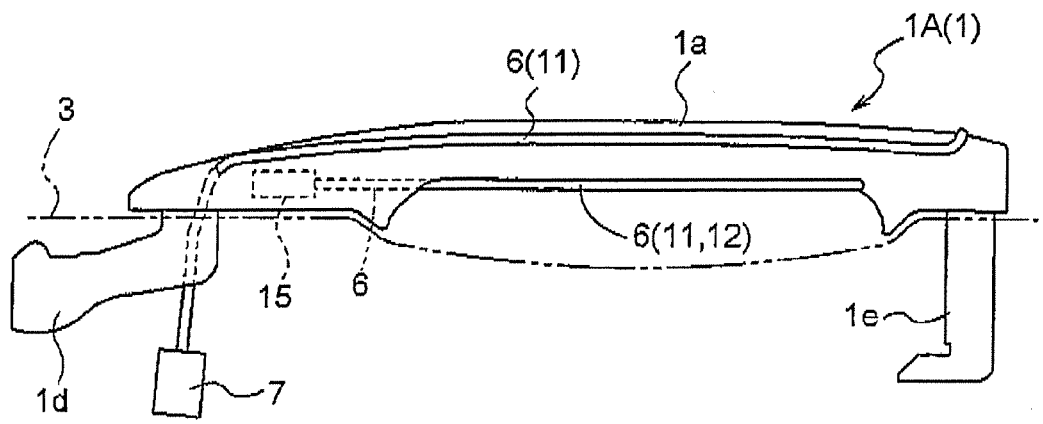
FIG. 3 is a side view of a door handle apparatus for the vehicle according to a first embodiment.
Figure 4:
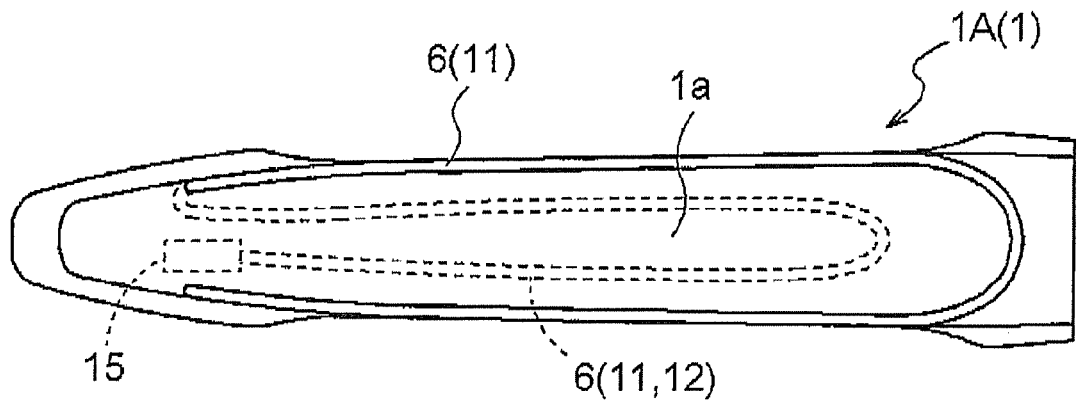
FIG. 4 is a top view of the door handle apparatus for the vehicle according to the first embodiment.
Figure 5:
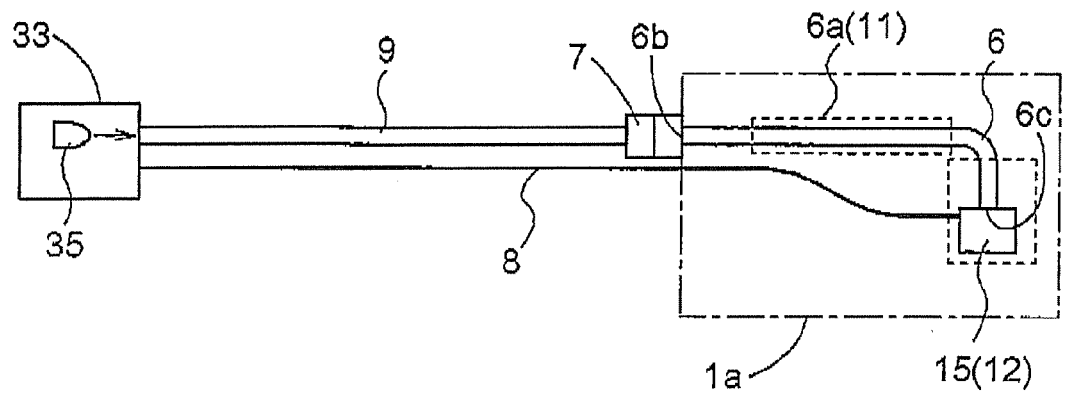
FIG. 5 is a block diagram schematically illustrating an example of a functional configuration of the door handle apparatus for the vehicle.
Figure 6:
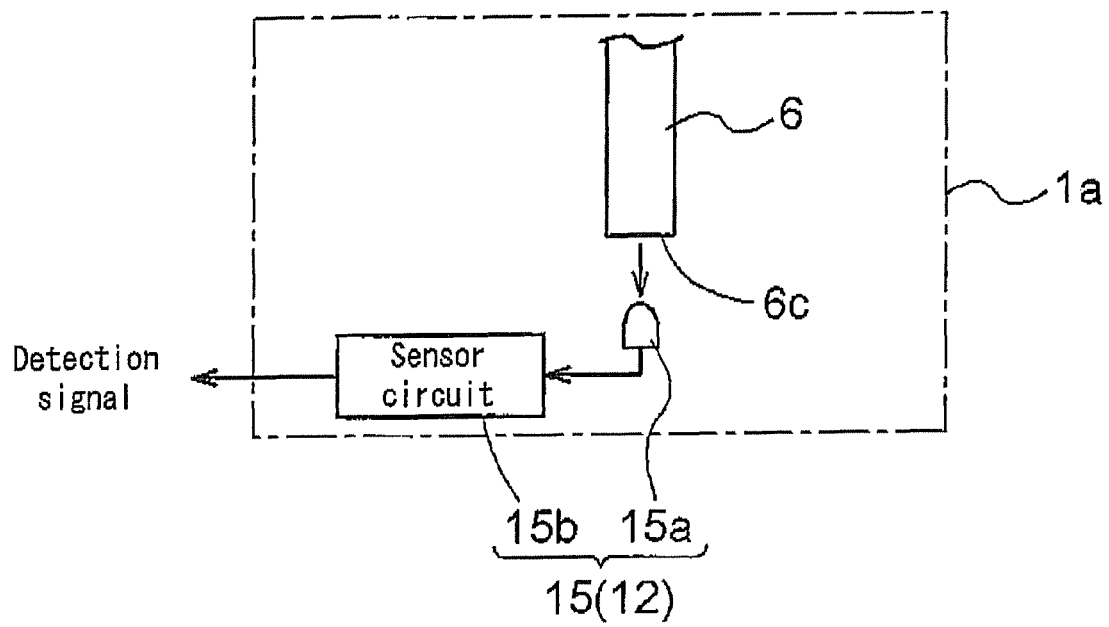
FIG. 6 is a block diagram schematically illustrating a configuration of an optical sensor portion of an operation detecting portion.
Figure 7:
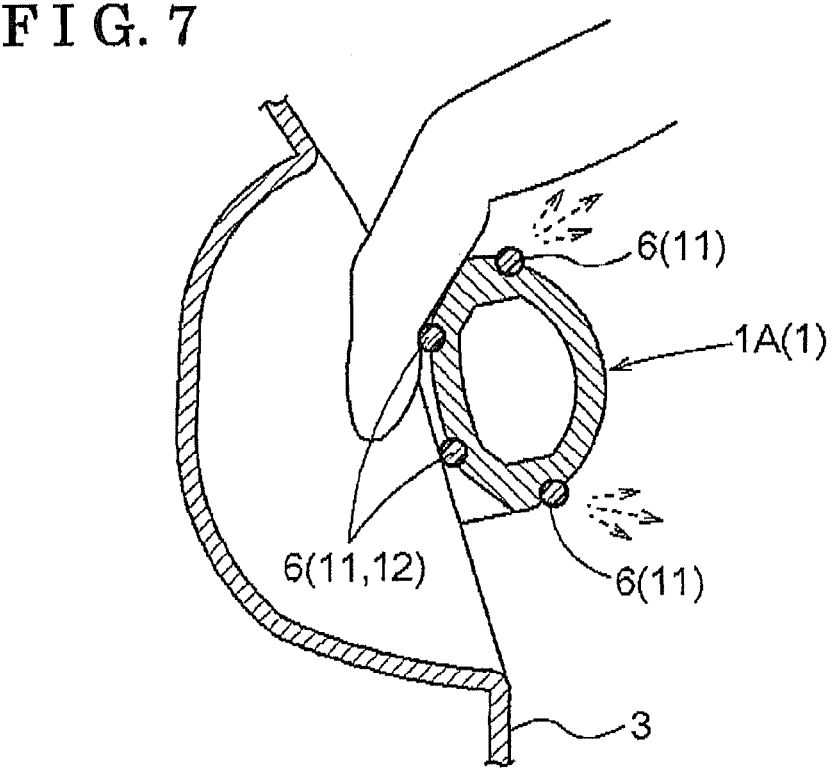
FIG. 7 is a diagram for explaining an example of detecting a manual operation of a user in the first embodiment.
Figure 17:
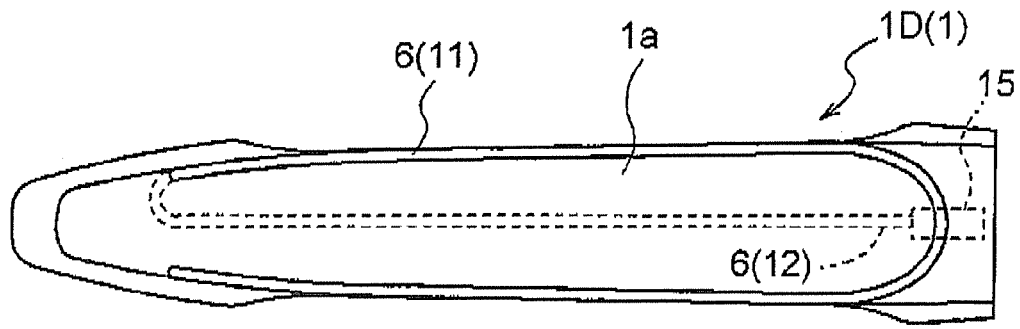
FIG. 17 is a top view of the door handle apparatus for the vehicle according to the fourth embodiment.

Illustrated in FIG. 3 is a side view of the door handle main body 1a of a door handle 1A (the door handle 1) relating to the first embodiment. Further, illustrated in FIG. 3 is an outline view of the handle main body 1a of the door handle 1A, which is provided at the vehicle door 2 as illustrated in FIG. 1, when viewed in a direction orthogonal to the vehicle door 2. Illustrated in FIG. 4 is a top view of the handle main body 1a of the door handle 1A. Further, illustrated in FIG. 4 is an outline view of the handle main body 1a, which is provided at the vehicle door 2 as illustrated in FIG. 17 when viewed from a side of the vehicle door 2 (i.e. when viewed towards the vehicle door 2). Illustrated in FIG. 5 is a block diagram schematically illustrating an example of a functional configuration of the door handle 1A. Illustrated in FIG. 6 is a block diagram schematically illustrating a configuration of an optical sensor portion 15 of the operation detecting portion 12. Illustrated in FIG. 7 is a view for explaining an example of a detection of the manual operation by the user to the door handle 1A.

As illustrated in FIG. 3, the handle main body 1a includes a hinge portion 1d and an arm portion 1e, which are accommodated within the door panel 3 when the handle main body 1a is in a neutral position, i.e. when the door handle 1 is in a non-operated state. An electric wire 8, such as a signal line, a power line and the like for connecting the transmission antenna 19 and the operation detecting portion 12, which are included within the handle main body 1a, with the vehicle exterior interface 33, which is provided at the inner side of the door panel 3, is wired to the door handle 1 via the hinge portion 1d. Furthermore, an optical fiber 6, which serves as an optical waveguide, is used in this embodiment. The optical fiber 6 is also wired to the door handle 1 via the hinge portion 1d, as illustrated in FIG. 3.

In the first embodiment, the optical fiber 6, which includes a first end portion 6b connected to an optical connector 7 and a second end portion 6c, is wired in a manner where being inserted into the handle main body 1a from the hinge portion 1d towards an outer surface of the handle main body 1a (i.e. a surface of the handle main body 1a not facing the door panel 1 (a first surface), an upper surface of the handle main body in FIG. 3) so as to across the handle main body 1a, so that the optical fiber 6 is penetrates through the handle main body 1a and being exposed to the outside of the vehicle. The exposed optical fiber 6 is further wired so as to extend along the outer surface of the handle main body 1a, facing opposite to the door panel 3, towards the arm portion 1e in a longitudinal direction of the handle main body 1a. The optical fiber 6 is curved in the vicinity of the arm portion 1e so as to form an arc and further extends along the outer surface of the handle main body 1a towards the hinge portion 1d. The exposed optical fiber 6 penetrated through the outer surface of the handle main body 1a in the vicinity of the hinge portion 1d and returned into the inside of the handle main body 1a. The optical fiber 6 returned into the handle main body 1a is further wired so as to across the handle main body 1a so that the optical fiber 6 penetrates the handle main body 1a towards the outside of the handle main body 1a and so that the optical fiber 6 is exposed at an inner surface of the handle main body 1a facing the door panel 3 (a second surface different from the first surface of the handle main body 1a). The exposed optical fiber 6 extends along the inner surface of the handle main body 1a towards the arm portion 1e in the longitudinal direction of the handle main body 1a. Then, the optical fiber is curved in the vicinity of the arm portion 1e so as to extend towards the hinge portion 1d. The optical fiber 6 is again returned into the handle main body 1a in the vicinity of the hinge portion 1d, so that the second end portion 6c of the optical fiber 6 is connected to the optical sensor portion 15, which is provided at the inside of the handle main body 1a.

The optical fiber 6 functions as the informing portion 11 and the operation detecting portion 12. In the first embodiment, as illustrated in FIG. 5, two optical fibers (the optical fiber 6 and an optical fiber 9) are used. More, specifically, in the first embodiment, the optical fiber 9 for transmitting a light, which is generated by the light source 35 configured by the LED and the like, to the optical connector 7, and the optical fiber 6 wired on the handle main body 1a via the optical connector 7 are used. The optical fiber 9 functions as the transmission path for the light. On the other hand, the optical fiber 6 functions as the informing portion 11 and the operation detecting portion 12. In the first embodiment, two optical fibers are used, however, the door handle 1A may be modified so as to transmit the light generated by the light source 35 to the optical sensor 15 by one optical fiber, without using the optical connector 7. However, by using the two optical fibers together with the optical connector 7 as in this embodiment, an operability of providing the handle main body 1a to the door panel 3 during an assembly process is improved, i.e. a process of assembling the handle main body 1a to the door panel 3 is eased. Additionally, as different specifications are adapted to the optical fiber 6 and the optical fiber 9, intended use of the optical fiber 6 and the optical fiber 9 is easily distinguishable, i.e. an error occurred during the assembling process of the optical fibers 6 and 9 may be prevented.

The optical fiber 6 leaks some of the light towards the outside thereof at least at a zone 6a (a light leakage zone 6a) on a transmission path, in addition to transmitting the light from the first end portion 6b connected to the optical connector 7 to the second end portion 6c connected to the optical sensor portion 15. The light outputted by the light source 35 is the visible light, which is used as the decorative light. The light leaked at the light leakage zone 6a of the optical fiber 6 serves as an illumination for the door handle 1A. In other words, the light leakage zone 6a of the optical fiber 6 serves as the informing portion 11.

The light, which is not leaked and which is transmitted through the optical fiber 6, reaches the second end portion 6c of the optical fiber 6c as the detection light of the optical sensor portion 15. The light reaching the second end portion 6c is outputted to a light receiving element 15a of the optical sensor portion 15 from the second end portion 6c. The light receiving element 15a converts the light, which is emitted from the optical fiber 6, into electricity (i.e. a photoelectric conversion). An output of the light receiving element 15a after the light is converted into the electricity is signal-processed by a sensor circuit 15b having functions such as impedance conversion, amplification and the like. The signal-processed output of the light receiving element 15a is transmitted to the system ECU 41 as the detection signal via the vehicle exterior interface 33. The optical sensor portion 15 and the optical fiber 6 serve as the operation detecting portion 12.

An example of the operation detecting portion 12 detecting a manual operation by the user will be described below with reference to FIG. 7. As illustrated in FIGS. 3 and 4, and as described above, a portion of the optical fiber 6 is wired along the surfaces of the handle main body 1a, preferably the optical fiber 6 is bonded on the surfaces of the handle main body 1a. Furthermore, it may be preferable if grooves having a depth, which corresponds to a diameter of the optical fiber 6, are provided on the surfaces of the handle main body 1a. The portions of the optical fiber 6 wired on the surfaces of the handle main body 1a serve as the light leakage zone 6a and as the informing portion 11. The optical fiber 6 may be modified so that the entire optical fiber 6 includes the light leakage zone 6a. Additionally, the portion of the optical fiber 6 extending along the inner surface of the door handle 1A facing the door panel 3 serves as the operation detecting portion 12.

As illustrated in FIG. 7, when the user puts his/her hand (finger) on the door handle 1A, the optical fiber 6 wired on the inner surface of the door handle 1A facing the door panel 3 is elastically deformed by being pressed by the user's hand (finger). Accordingly, a cross-sectional area of the optical fiber 6 is reduced, thereby reducing an amount of transmissive light (i.e. an amount of light transmitted through the optical fiber 6). As a result, the amount of light reaching the optical sensor portion 15 is reduced, therefore, an amount of charge, which is generated by converting the transmitted light into the electricity by the light receiving element 15a, is reduced. The sensor circuit 15b outputs the detection signal in response to the amount of charge. Accordingly, the system ECU 41 is capable of determining whether or not the manual operation is performed by the user on the basis of the detection signal. Additionally, the door handle 1A of the first embodiment may be modified so that the sensor circuit 15b determines whether or not the manual operation is performed by the user on the basis of the detection signal, and so that the determination result is outputted to the system ECU 41 as the detection signal.

An example of a case where the unlocking control executed by the locking system is adapted to the door handle 1A, relating to the first embodiment, will be described below. The system ECU 41 outputs the request signal towards the outside of the vehicle so as to be transmitted to the portable device 5 towards the outside of the vehicle via the transmission antenna 19, which is provided within the door handle 1A. When the portable device 5 is carried into the range of request signal coverage, the controlling portion 51 of the portable device 5 receives the request signal via the receiving antenna 52 and the receiver circuit 53. The controlling portion 51 of the portable device 5 transmits the response signal including the ID code responding to the request signal towards the vehicle via the transmission circuit 54 and the transmission antenna 55.

The response signal, transmitted from the portable device 5, is received by the receiving antenna 43 provided within the vehicle interior. Then, the received request signal is transmitted to the system ECU 41 via the receiver circuit 42, which is provided within the vehicle. In the case where the received ID code corresponds with the preliminarily set ID code, the system ECU 41 authenticates that the portable device 5, from which the response signal is transmitted, is the portable device that corresponds to the vehicle. Then, the system ECU 41 turns to be in the state of awaiting the unlocking command for the vehicle door 2, in other words, the system ECU 41 turns to be in the state of awaiting the operation input by the user.

When the system ECU 41 is turned to be in the state of awaiting the operation input by the user, the system ECU 41 drives the light source 35 via the vehicle exterior interface 33 in order to optically inform the user that the system ECU 41 is in the state of awaiting the operation input by means of the decorative light, which is the visible light, via the informing portion 11. In other words, the user is visually notified the control state of the vehicle door 2 by the visible light leaking from the light leakage zone 61 of the optical fiber 6.

When the user carrying the portable device 5 approaches the vehicle and touches the door handle 1A, such active-direct operation by the user is detected by the operation detecting portion 12, which is provided at the door handle 1A. The detection result by the operation detecting portion 12 is transmitted to the system ECU 41 via the vehicle exterior interface 33. The system ECU 41 drives the lock actuator 32 via the door ECU 31 in order to unlock the vehicle door 2.

As described above, the door handle 1A for the vehicle according to the first embodiment includes the informing portion 11 for visually informing the user of the state of the vehicle door 2, including the locking/unlocking state of the vehicle door 2, by using the decorative light, which is the visible light. Furthermore, the door handle 1A for the vehicle includes the operation detecting portion 12 for optically detecting the active-direct operation to the door handle 1A for the vehicle by the user, on the basis of changes in the detection light. Further, the door handle 1A for the vehicle includes the optical fiber 6 (optical waveguide) for transmitting the decorative light and the detection light, which is inputted into the optical fiber 6 from the first end portion 6b thereof, to the second end portion 6c. Additionally, the optical fiber 6 serves as the informing portion 11 by leaking and emitting the decorative light on the transmission path, further, the optical fiber 6 serves as the operation detecting portion 12 by outputting the detection light from the second end portion 6c.

In the first embodiment, the optical fiber 6 (the optical waveguide) of the door handle 1A for the vehicle is formed so as to be elastically deformable in response to an external force applied thereto. Further, at least a portion of the optical fiber 6 is wired on the surface of the handle main body 1a of the door handle 1A for the vehicle. The informing portion 11 is configured by the optical fiber 6, which is provided on the outer surface of the handle main body 1a facing opposite to the vehicle door 2. The operation detecting portion 12 is configured so as to include an operation inputting portion, which is configured by the optical fiber 6 whose cross-sectional area changes by the active-direct operation by the user, and the optical sensor portion 15 for receiving the detection light, which is outputted from the second end portion 6c of the optical fiber 6. Additionally, in the first embodiment, the optical fiber 6, which serves as the operation inputting portion of the operation detecting portion 12, is provided on the inner surface of the handle main body 1a facing the vehicle door 2.

According to the first embodiment, both of the informing portion 11 and the operation detecting portion 12 are configured by using the identical optical fiber 6. Accordingly, a number of components used for the door handle 1A for the vehicle is reduced. Further, a connecting line for connecting the vehicle door 2 and the door handle 1A for the vehicle does not need to be provided. In this embodiment, the optical fibers 6 and 9 and the electric wire 8 also serve as the connecting line. As a result, the door handle 1 for the vehicle is configured by a simple structure. Furthermore, the door handle 1A for the vehicle by which the user easily perceives the locking/unlocking state of the vehicle door 2 based on the visible light, which is leaked and emitted, is achieved. Additionally, the door handle 1A for the vehicle, which properly detects the active-direct operation by the user on the basis of the detection light being transmitted by the optical fiber 6, is achieved.

The optical fiber 6, including the light leakage zone 6a, is provided at the outer surface of the handle main body 1a other than the inner surface thereof facing the vehicle door 2. Accordingly, the state of the vehicle door 2 is clearly informed to the user outside of the vehicle by the decorative light, which is the visible light leaked on the transmission path so as to be emitted to the outside of the vehicle. Further, because the optical sensor portion 15 detects the amount of transmitted detection light, which changes in response to changes in the cross-sectional area of the optical fiber 5, which is elastically deformable by the active-direct operation by the user, the active operation by the user is properly detected.

The user performs an operation with using his/her hand (finger) when operating the door handle 1A for the vehicle. When the user manually operates the door handle 1A for the vehicle, an end portion of the hand of the user, which applies relatively strong operational force to the door handle 1A, is positioned between the vehicle door 2 and the door handle 1A for the vehicle. Accordingly, by providing the optical fiber 6, which functions as the operation inputting portion, on the inner surface of the handle main body 1a facing the vehicle door 2, the external force applied to the door handle 1A by the operation of the user is properly received by the operation detecting portion 12. As a result, the operation detecting portion 12 properly detects the active-direct operation to the door handle 1A by the user.

Second Embodiment

Figure 8:
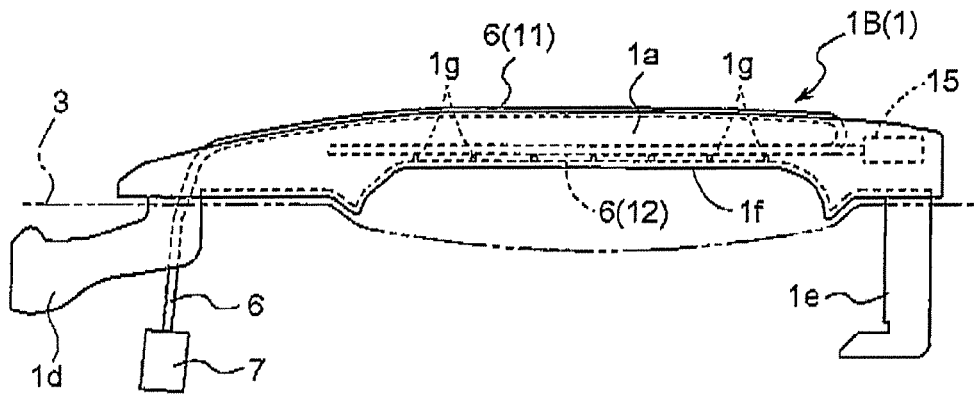
FIG. 8 is a side view of a door handle apparatus for a vehicle according to a second embodiment.
Figure 9:
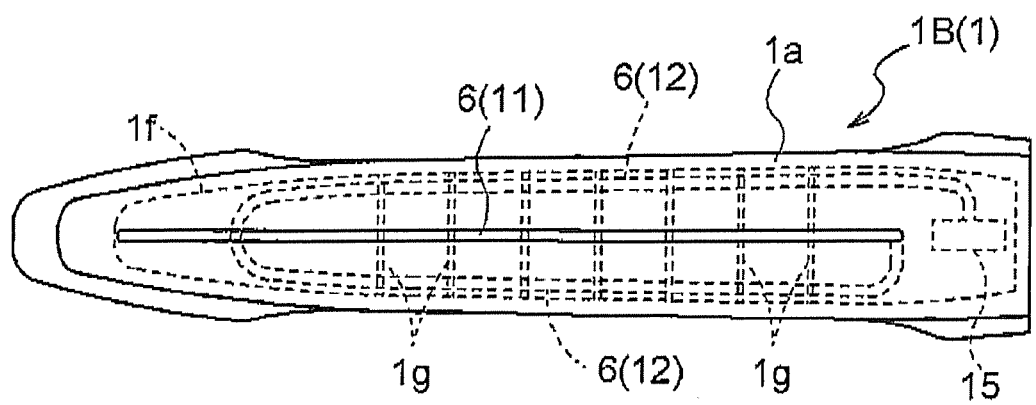
FIG. 9 is a top view of the door handle apparatus for the vehicle according to the second embodiment.
Figure 10:
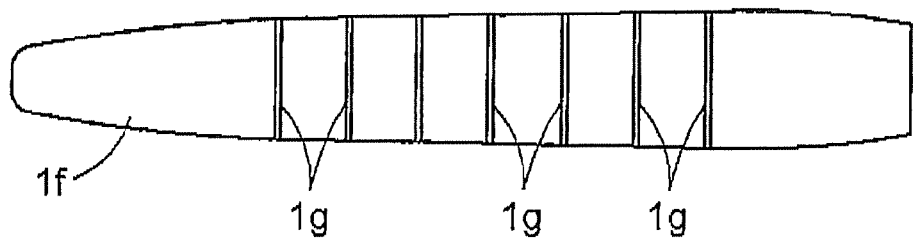
FIG. 10 is a top view of a back cover of the door handle apparatus for the vehicle according to the second embodiment.
Figure 11:
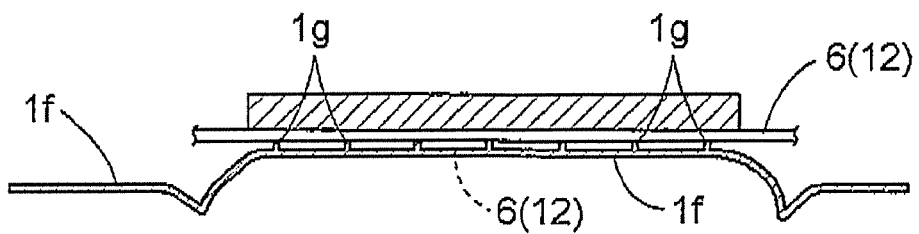
FIG. 11 is a side view of the back cover of the door handle apparatus for the vehicle according to the second embodiment.

A second embodiment of the door handle 1 for the vehicle will be described below. The same components, parts, functions and the like with the first embodiment will be omitted here. Illustrated in FIG. 8 is a side view of the door handle main body 1a of a door handle 1B (the door handle 1) relating to the second embodiment. Further, illustrated in FIG. 8 is an outline view of the handle main body 1a of the door handle 1B, which is provided at the vehicle door 2 as illustrated in FIG. 1, when viewed in a direction orthogonal to the vehicle door 2. Illustrated in FIG. 9 is a top view of the handle main body 1a of the door handle 1B. Further, illustrated in FIG. 9 is an outline view of the handle main body 1a, which is provided at the vehicle door 2 as illustrated in FIG. 1, when viewed from a side of the vehicle door 2 (i.e. when viewed towards the vehicle door 2). Illustrated in FIG. 10 is a top view of a back cover 1f (a cover portion) of the door handle 1B relating to the second embodiment. Further, illustrated in FIG. 10 is the view illustrating the back cover 1f when being viewed from the inner side of the handle main body 1a. Illustrated in FIG. 11 is a side view of the back cover 1f of the door handle 1B relating to the second embodiment.

In the second embodiment, the optical fiber 6, which includes the first end portion 6b connected to the optical connector 7 and the second end portion 6c, is wired in a manner where being inserted into the handle main body 1a from via the hinge portion 1d towards the outer surface of the handle main body 1a so as to across the handle main body 1a, so that the optical fiber 6 penetrates through the handle main body 1a and being exposed to the outside of the vehicle. The exposed optical fiber 6 is further wired so as to extend along the outer surface of the handle main body 1a towards the arm portion 12 in the longitudinal direction. The optical fiber 6, extending along the outer surface of the handle main body 1a, is returned into the handle main body 1a in the vicinity of the arm portion 1e so as to across the handle main body 1a. The optical fiber 6 returned into the handle main body 1a further wired so as to extend within the handle main body 1a along the back cover 1f towards the hinge portion 1d at a side of the inner surface of the handle main body 1a facing the door panel 3. The optical fiber 6 then is curved in the vicinity of the hinge portion 1d and is extended within the handle main body 1a towards the arm portion 1e. Then, the second end portion 6c of the optical fiber 6 is connected to the optical sensor portion 15. Additionally, as is the case with the first, embodiment, a wiring pathway of the optical fiber 6, which is provided on the outer surface of the handle main body 1a facing opposite to the door panel 3, may be provided so as to have a return pathway.

As is the case with the first embodiment, the optical fiber 6 leaks some of the light towards the outside of the optical fiber 6 at least at the zone 6a (the light leakage zone 6a) on the transmission path, in addition to the transmission of the lights from the first end portion 6b connected to the optical connector 7 to the second end portion 6c connected to the optical sensor portion 15. The decorative light outputted by the light source 35 is the visible light, so that the light leaked from the optical fiber 6 serves as the illumination for the door handle 1B. In other words, the optical fiber 6 at the light leakage zone 6a serves as the informing portion 1.

As is the case with the first embodiment, the light, which is transmitted through the optical fiber 6 without being leaked, reaches the second end portion 6c of the optical fiber 6 as the detection light of the optical sensor portion 15. The reached light is outputted from the second end portion 6c to the light receiving element 15a of the optical sensor portion 15. The light receiving element 15a converts the light, which is outputted from the optical fiber 6, into electricity (i.e. the photoelectric conversion). The output of the light receiving element 15a after the photoelectric conversion is signal-processed by the sensor circuit 15b having functions such as the impedance conversion, the amplification and the like. The signal-processed output of the light receiving element 15a is transmitted to the system ECU 41 as the detection signal via the vehicle exterior interface 33. The optical sensor portion 15 and the optical fiber 6 serve as the operation detecting portion 12.

An example of the operation detecting portion 12 detecting the manual operation by the user will be described below with reference to FIG. 12. As illustrated in FIGS. 8 to 11, and as described above, the light, which leaks from the light leakage zone 6a of the optical fiber 6 provided on the surfaces of the handle main body 1a, serves as the illumination for the door handle 1B. In other words, the light leakage zone 6a of the optical fiber 6 serves as the informing portion 11. The optical fiber 6 provided along the back cover 1f of the door handle 1B within the handle main body 1a further serves as the operation detecting portion 12. The optical fiber 6, which serves as the operation detecting portion 12, is held by a case portion 1j and the back cover 1f of the handle main body 1a. The back cover 1f is formed to include plural protruding portions 1g (protruding portions), which protrude towards inner side of the case portion 1j. Further, the back cover f is provided so as to be displaceable towards the inner side of the case portion 1j from a neutral position, by the operation by the user. The neutral position of the back cover 1f refers to a position where the back cover 1f is positioned when the pressure or force is not applied thereto by the user (i.e. when the active-direct operation is not conducted by the user).

Figure 12:
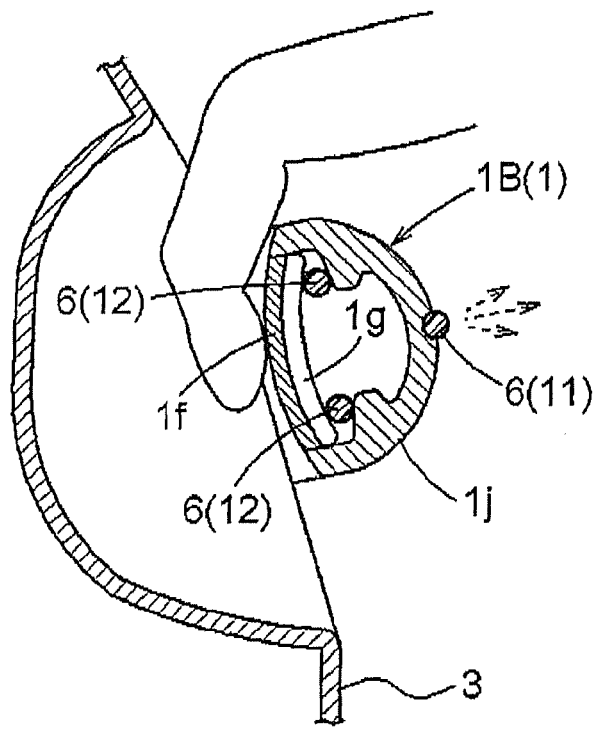
FIG. 12 is a view for explaining an example of detecting the manual operation by the user in the second embodiment.

As illustrated in FIG. 12, when the user puts his/her hand (finger) on the door handle 1B so as to apply a force thereto, the back cover 1f is displaced towards the inner side of the case portion 1j from the neutral position. Then, the optical fiber 6, which is held between the case portion 1j of the handle main body 1a and the back cover 1f, is pushed by the protruding portions 1g of the back cover 1f; therefore, the optical fiber 6 elastically deforms. Accordingly, the cross-sectional area of the optical fiber 6 is reduced, and therefore, the amount of light transmitted through the optical fiber 6 is also reduced. As a result, the amount of light reaching the optical sensor portion 15 is reduced, which results in reducing the amount of charge, generated by photoelectric conversion (converting the light into the electricity) of the light receiving element 15a. The sensor circuit 15b outputs the detection signal in response to the amount of charge. Accordingly, the system ECU 41 determines whether or not the manual operation is performed by the user, on the basis of the detection signal.

A process for the unlocking control in a case where the unlocking control of the locking system is adapted to the door handle 1B of the second embodiment is substantially the same as the case of the first embodiment. Therefore, the detailed explanation about the process for the unlocking control will be omitted.

Third Embodiment

Figure 13:
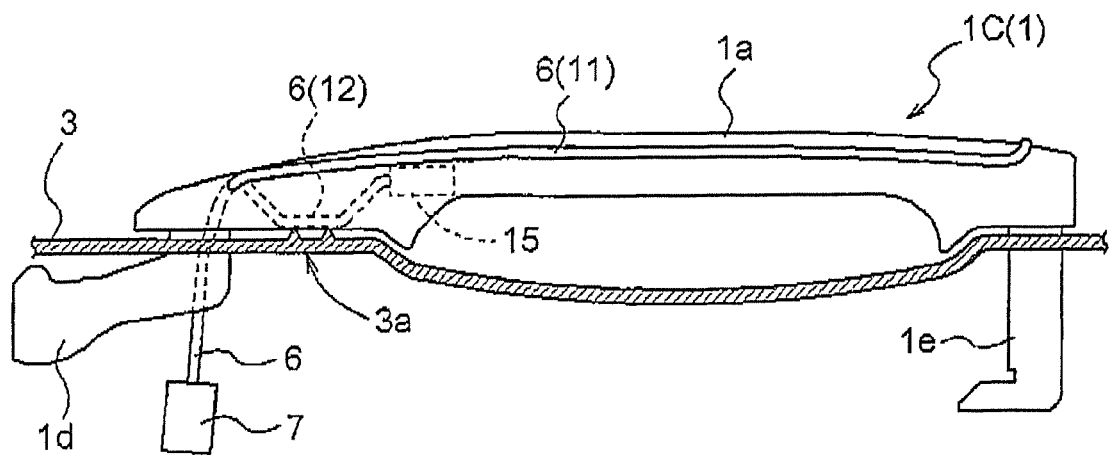
FIG. 13 is a side view of a door handle apparatus for a vehicle according to a third embodiment.

A third embodiment of the door handle 1 for the vehicle will be described below. The same components, parts, functions and the like with the first and second embodiments will be omitted here. Illustrated in FIG. 13 is a side view of the door handle main body 1a of a door handle 1C (the door handle 1) relating to the third embodiment. Further, illustrated in FIG. 13 is an outline view of the handle main body 1a of the door handle 1C, which is provided at the vehicle door 2 as illustrated in FIG. 1, when viewed in a direction orthogonal to the vehicle door 2. Illustrated in FIG. 14 is a top view of the handle main body 1a of the door handle 1C. Further, illustrated in FIG. 14 is an outline view of the handle main body 1a, which is provided at the vehicle door 2 as illustrated in FIG. 1, when viewed from a side of the vehicle door 2 (i.e. when being viewed towards the vehicle door 2). Illustrated in FIG. 15 is a view for explaining an example of detecting the manual operation to the door handle 1C by the user.

In the third embodiment, the optical fiber 6, which includes the first end portion 6b connected to the optical connector 7 and the second end portion 6c, is wired in a manner where being inserted into the handle main body 1a from the hinge portion 1d towards the outer surface of the handle main body 1a so as to across the handle main body 1a, so that the optical fiber 6 penetrates the handle main body 1a and being exposed to the outside of the vehicle. The exposed optical fiber 6 is further wired so as to be extended along the outer surface of the handle main body 1a in the longitudinal direction thereof. The optical fiber 6 is curved in the vicinity of the arm portion 1e so as to extend along the outer surface of the handle main body 1a towards the hinge portion 1e. The exposed optical fiber 6 is returned into the handle main body 1a in the vicinity of the hinge portion 1d. The optical fiber 6, returned into the handle main body 1a, is led towards the door panel 3, so that the optical fiber 6 is held between the handle main body 1a and the door panel 3. A projecting portion 3a is provided on the door panel 3 at, for example, a side of the hinge portion 1d. In this embodiment, for example, two projecting portions 3a and 3a are provided on the door panel 3. The optical fiber 6 is held between the protruding portions 3a and 3a of the door panel 3 and the handle main body 1a (more specifically, between the protruding portions 3a and 3a of the door panel 3 and a supporting portion of the handle main body 1a), so that the optical fiber 6 is pressed and deformed by the protruding portions 3a and 3a while the door handle 1C is in a neutral position, which corresponds to a state where the door handle 1C is not operated. The second end portion 6c of the optical fiber 6 is connected to the optical sensor portion 15.

As is the case with the first and second embodiments, the optical fiber 6 leaks some of the light towards the outside of the optical fiber 6 at least at the zone 6a (the light leakage zone 6a) on the transmission path, in addition to the transmission of the lights from the first end portion 6b connected to the optical connector 7 to the second end portion 6c connected to the optical sensor portion 15. The light outputted by the light source 35 is the visible light, so that the light leaked from the optical fiber 6 serves as the illumination for the door handle 1C. In other words, the optical fiber 6 at the light leakage zone 6a serves as the informing portion 11.

As is the case with the first and second embodiments, the light, which is transmitted through the optical fiber 6 without being leaked, reaches the second end portion 6c of the optical fiber 6 as the detection light of the optical sensor portion 15. The reached light is outputted from the second end portion 6c to the light receiving element 15a of the optical sensor portion 15. The light receiving element 15a converts the light, which is outputted from the optical fiber 6, into electricity (i.e. the photoelectric conversion). The output of the light receiving element 15a after the photoelectric conversion is executed to the received light is signal-processed by the sensor circuit 15b having the functions such as the impedance conversion, the amplification and the like. The signal-processed output of the light receiving element 15a is transmitted to the system ECU 41 as the detection signal via the vehicle exterior interface 33. The optical sensor portion 15 and the optical fiber 6 serve as the operation detecting portion 12.

As illustrated in FIGS. 13 and 14, and as described above, the light leaking from the light leakage zone 6a of the optical fiber 6, which is provided on the surfaces of the handle main body 1a, serves as the illumination for the door handle 1C. In other words, the light leakage zone 6a of the optical fiber 6 serves as the informing portion 11.

When the user operates the door handle 1C, which is in a state as illustrated in FIG. 15A, the door handle 1C is displaced and a clearance is formed between the door panel 3 and the handle main body 1a, as illustrated in FIG. 15B. More specifically, the clearance is generated between the handle main body 1a and the protruding portions 3a and 3a of the door panel 3. The optical fiber 6, which is held between the protruding portions 3a and 3a and the handle main body 1a and to which a compressive force is applied while the door handle 1C is in the non-operated state, is released from the compressive force. Accordingly, the cross-sectional area of the optical fiber 6 increases, therefore, the amount of light transmitted through the optical fiber 6 also increases. As a result, the amount of light reaching the optical sensor portion 15 increases, therefore, the amount of charge, generated by the light receiving element 15a converting the light into the electricity, is also increased. The sensor circuit 15b outputs the detection signal in response to the amount of charge. Accordingly, the system ECU 41 is capable of determining whether or not the manual operation is performed by the user on the basis of the detection signal.

The optical fiber 6 may be elastically compressed by a biasing force applied thereto while the door handle 1C is in the non-operated state. In this case, the detection light inputted to the optical sensor portion 15 becomes approximately zero (0). In this case, when the user operates the door handle 1C, the detection light is inputted into the optical sensor portion 15. Accordingly, the optical sensor portion 15 detects the operation to the door handle 1C by the user with reference to a state where the amount of light reaching the optical sensor portion 15 is approximately zero (0) (i.e. by comparing the detection result of when the amount of light is approximately zero (0) with the detection result of when the door handle 1C is operated). In this case, the operation detecting portion 12 further properly and clearly detects the active operation to the door handle 1C by the user.

A process for the unlocking control in a case where the unlocking control of the locking system is adapted to the door handle 1C of the third embodiment is substantially the same as the case of the first and second embodiments. Therefore, the detailed explanation about the process for the unlocking control will be omitted.

Fourth Embodiment

A fourth embodiment of the door handle 1 for the vehicle will be described below. The same components, parts, functions and the like with the first, second and third embodiments will be omitted here. Illustrated in FIG. 16 is a side view of the door handle main body 1a of a door handle 1D (the door handle 1) relating to the fourth embodiment. Further, illustrated in FIG. 13 is an outline view of the handle main body 1a of the door handle 1D, which is provided at the vehicle door 2 as illustrated in FIG. 1, when being viewed in a direction orthogonal to the vehicle door 2. Illustrated in FIG. 17 is a top view of the handle main body 1a of the door handle 1D. Further, illustrated in FIG. 17 is an outline view of the handle main body 1a, which is provided at the vehicle door 2 as illustrated in FIG. 1, when viewed from a side of the vehicle door 2 (i.e. when being viewed towards the vehicle door 2). Illustrated in FIG. 18 is a view for explaining an example of detecting the manual operation to the door handle 1D by the user.

In the fourth embodiment, the optical fiber 6, which includes the first end portion 6b connected to the optical connector 7 and the second end portion 6c, is wired in a manner where being inserted into the handle main body 1a from the hinge portion 1d towards the outer surface of the handle main body 1a so as to extend across the handle main body 1a, so that the optical fiber 6 penetrates the handle main body 1a and being exposed to the outside of the vehicle. The exposed optical fiber 6 is further wired so as to extend along the outer surface of the handle main body 1a in the longitudinal direction thereof. The exposed optical fiber 6 is curved in the vicinity of the arm portion 1e so as to extend along the outer surface of the handle main body 1a towards the hinge portion 1d and then, the optical fiber 6 is returned into the handle main body 1a in the vicinity of the hinge portion 1d. The optical fiber 6, returned into the handle main body 1a, is led towards the arm portion 1e within the handle main body 1a. Then, the optical fiber 6 is let towards the door panel 3 within the handle main body 1a in the vicinity of the arm portion 1e, so that the optical fiber 6 is held between the handle main body 1a and the door panel 3. A projecting portion 3b is provided on the door panel 3 at, for example, the side of the arm portion 1e. In this embodiment, one projecting portion 3b is provided on the door panel 3, however, any desired number of projecting portions 3b may be provided at the door panel 3. The optical fiber 6 is held between the handle main body 1a and the projecting portion 3b of the door panel 3 (more specifically, between the supporting portion of the handle main body 1a and the projecting portion 3b), so that the optical fiber 6 is pressed by the projecting portion 3b while the door handle 1D is in a neutral state, which corresponds to the non-operated state of the door handle 1D. The second end portion 6c of the optical fiber 6 is connected to the optical sensor portion 15.

The door handle 1D of the fourth embodiment has a similar configuration with the door handle 1C except that the door handle 1C of the third embodiment is configured so that the optical fiber 6 is held between the handle main body 1a and the door panel 3 at the side of the arm portion 1e, while the optical fiber 6 is held between the handle main body 1a and the door panel 3 at the side of the hinge portion 1d in the third embodiment. As illustrated in FIGS. 16 and 17, the light, which outwardly leaks from the light leakage zone 6a of the optical fiber 6 provided on the surfaces of the handle main body 1a, serves as the illumination for the door handle 1D. In other words, the light leakage zone 6a of the optical fiber 6 serves as the informing portion 11. Furthermore, the optical fiber 6, which is held between the handle main body 1a and the projecting portion 3b of the door panel 3, serves as the operation detecting portion 12.

Figure 18A:
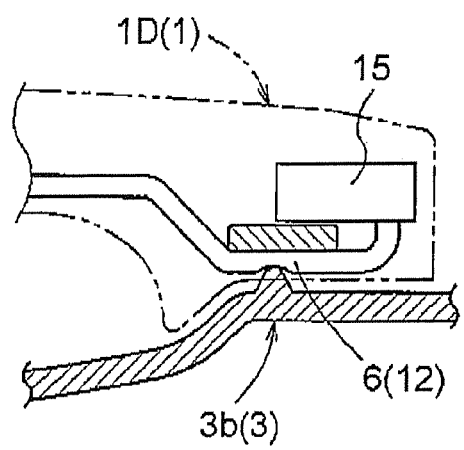
FIG. 18A is a view for explaining an example of a state of the door handle apparatus for the vehicle before the manual operation by the user is detected in the third embodiment.
Figure 18B:
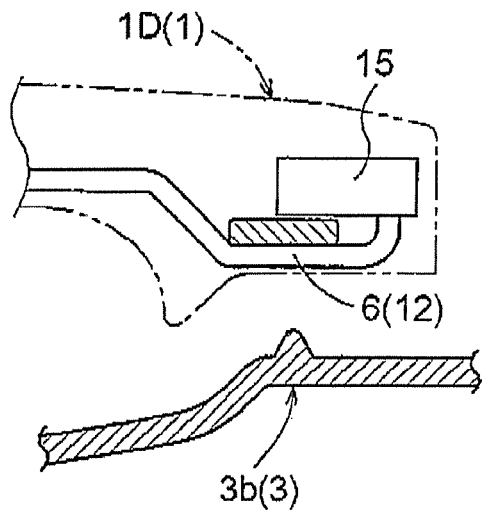
FIG. 18B is a view for explaining an example of detecting the manual operation by the user in the fourth embodiment.

As illustrated in FIG. 18, when the user operates the door handle 1D so as to displace the door handle 1D, a clearance is generated between the handle main body 1a and the door panel 3. More specifically, the clearance is generated between the handle main body 1a and the projecting portion 3b of the door panel 3 when the door handle 1D is manually operated by the user. The optical fiber 6, which is held between the projecting portion 3b of the door panel 3 and the handle main body 1a and to which the compressive force is applied, is released from the compressive force when the door handle 1D is operated. Accordingly, the cross-sectional area of the optical fiber 6 increases, therefore, the amount of light transmitted through the optical fiber 6 also increases. As a result, the amount of light reaching the optical sensor portion 15 increases, therefore, the amount of charge, generated by the light receiving element 15a converting the light into the electricity, is also increased. The sensor circuit 15b outputs the detection signal in response to the amount of charge. Accordingly, the system ECU 41 is capable of determining whether or not the manual operation is performed by the user on the basis of the detection signal.

A process for the unlocking control in a case where the unlocking control of the locking system is adapted to the door handle 1D of the fourth embodiment is substantially the same as the case of the first embodiment. Therefore, the detailed explanation about the process for the unlocking control will be omitted.

Overview of Second, Third and Fourth Embodiments

Each of the door handle 1B of the second embodiment, the door handle 1C of the third embodiment and the door handle 1D of the fourth embodiment has the following configuration similar to the door handle 1A of the first embodiment. The door handle 1 (1B, 1C, 1D) for the vehicle includes the informing portion 11 for visually informing the user of the state of the vehicle door 2, including the locking/unlocking state of the vehicle door 2, by using the decorative light, which is the visible light. Further, the door handle 1 (1B, 1C, 1D) for the vehicle includes the operation detecting portion 12 for optically detecting the active-direct operation to the door handle 1 (1B, 1C, 1D) by the user on the basis of changes in the detection light. The door handle 1 (1B, 1C, 1D) for the vehicle includes the optical fiber 6 (the optical waveguide), which functions as the informing portion 11 by leaking the decorative light on the transmission path so as to be emitted to the outside of the vehicle and as the operation detection portion 12 by outputting the detection light from the second end portion 6c, in addition to transmitting the decorative light and the detection light, which is inputted from the first end portion 6b of the optical fiber 6, to the second end portion 6c.

As is the case with the first embodiment, the optical fiber 6 (the optical waveguide) of the door handle 1 for the vehicle (i.e. the door handle 1B of the second embodiment, the door handle 1C of the third embodiment, and the door handle 1D of the fourth embodiment), is formed so as to be elastically deformable in response to the external force applied thereto. Further, at least a portion of the optical fiber 6 is provided on the surface of the handle main body 1a of the door handle 1 (1B, 1C, 1D) for the vehicle. The informing portion 11 is configured with the optical fiber 6, which is provided at the surface of the handle main body 1a other than the surface facing to the vehicle door 2. The operation detecting portion 12 is configured so as to include the operation inputting portion, which is configured with the optical fiber 6 whose cross-sectional area changes in response to the active-direct operation by the user, and the optical sensor portion 15 for receiving the detection light, which is outputted from the second end portion 6c of the optical fiber 6.

In the second embodiment, the handle main body 1a includes the case portion 1j, which includes an opening portion opening towards the vehicle door 2 in the state where the handle main body 1a is attached at the vehicle door 2, and the back cover 1f (the cover portion), which covers the opening portion of the case portion 1j, being provided so as to be displaced towards the inner side of the case portion 1j from the neutral position in response to the operation by the user, and which includes plural protruding portions 1g protruding towards the inner side of the case portion 1j. The optical fiber 6, which functions as the operation inputting portion, is wired within the handle main body 1a in the state where the optical fiber 6 is being held between the case portion 1j and the protruding portions 1g of the back cover 1f. In the third and fourth embodiment, the vehicle door 2 includes the projecting portion (3a, 3b), which is pressed against the door handle 1 (1C, 1D) for the vehicle when the door handle 1 (1C, 1D) for the vehicle is in the non-operated state. The optical fiber 6, which functions as the operation inputting portion, is held between the projecting portion (3a, 3b) of the vehicle door 2 and the door handle 1 (1C, 1D) for the vehicle while the door handle 1(1C, 1D) for the vehicle is in the non-operated state. The optical fiber 6 is released from the state where the optical fiber 6 being held between the protruding portion of the vehicle door 2 and the door handle 1 (1C, 1D), when the door handle 1 (1C, 1D) for the vehicle is in the operated state.

The door handle 1 (1B) for the vehicle according to the second embodiment differs from the door handle 1 (A) for the vehicle according to the first embodiment in that the optical fiber 6 is not directly touched by the user and pressed by the user's hand or the finger when the user holds the door handle 1 (1B) for the vehicle. Accordingly, the door handle 1B for the vehicle is operated while preventing the user from feeling discomfort. As described above, the user is likely to operate the door handle 1 with his/her hand (finger), more specifically, the user is likely to hold the door handle 1 with his/her hand when operating the door handle 1 for the vehicle. In this case, the user's hand (finger), by which a relatively strong operating force is applied to the door handle 1, is placed between the vehicle door 2 and the door handle 1. The optical fiber 6, which functions as the operation inputting portion, is provided within the handle main body 1a in the state where the optical fiber 6 is held between the case portion 1j and the protruding portions 1g of the back cover 1f (the cover portion), which is provided to the door handle 1B so that the back cover 1f faces the vehicle door 2. Accordingly, the optical fiber 6, which functions as the operation detecting portion 12, properly receives the external force, which is applied to the door handle 1 for the vehicle by the operation of the user. As a result, the operation detecting portion 12 properly detects the active operation to the door handle 1B by the user.

Even in the third and fourth embodiments, the optical fiber 6 is not directly touched and is not pressed by the user's hand or the finger when the user holds the door handle 1 (1C, 1D) for the vehicle. Accordingly, the door handle 1 (1C, 1D) for the vehicle is operated while preventing the user from felling discomfort. Further, the optical fiber 6 may be configured so as to be elastically compressed by the biasing force applied thereto while the door handle 1 for the vehicle is in the non-operated state. In this case, the detection light inputted into the optical sensor portion 15 becomes approximately zero (0). On the other hand, in this case, when the door handle 1 (1C, 1D) for the vehicle is operated by the user, the detection light is inputted into the optical sensor portion 15. Accordingly, the optical sensor portion 15 detects the operation to the door handle 1 (1C, 1D) for the vehicle by the user with reference to the state where the amount of light is approximately zero (0), i.e. by comparing the amount of light when the door handle 1 (1C, 1D) is operated with the amount of light when the door handle 1 (1C, 1D) is not operated (i.e. the amount of light is approximately zero (0)). As a result, the operation detecting portion 12 properly detects the active operation performed by the user.

Fifth Embodiment

Figure 19:
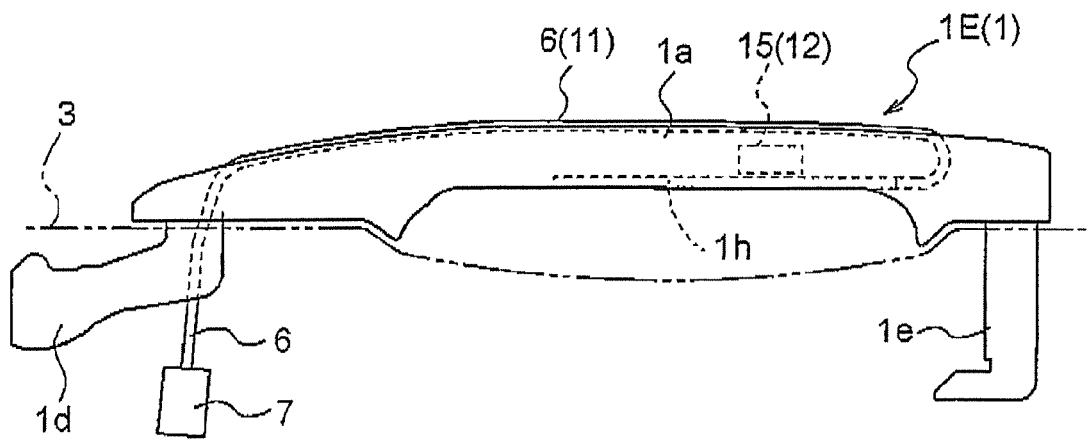
FIG. 19 is a side view of a door handle apparatus for a vehicle according to a fifth embodiment.
Figure 20:
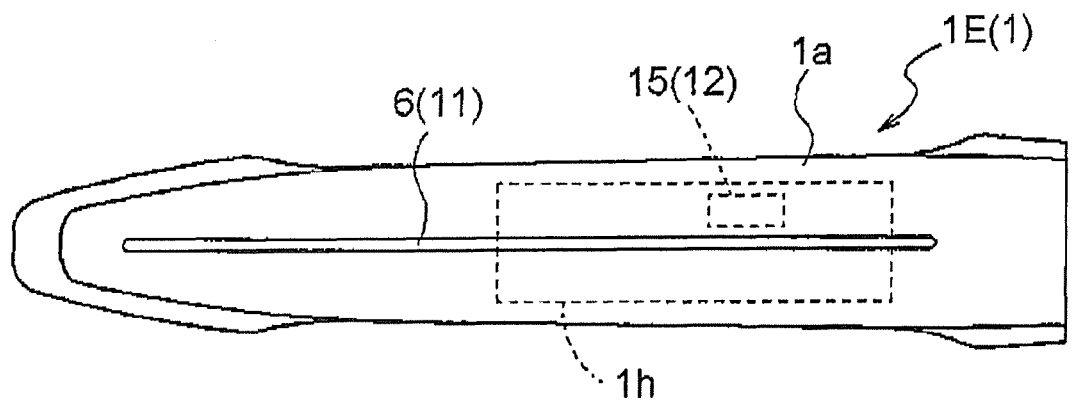
FIG. 20 is a top view of the door handle apparatus for the vehicle according to the fifth embodiment.

A fifth embodiment of the door handle 1 for the vehicle will be described below. The same components, parts, functions and the like with the above-described embodiments will be omitted here. Illustrated in FIG. 19 is a side view of the door handle main body 1a of a door handle 1E (the door handle 1) relating to the fifth embodiment. Further, illustrated in FIG. 19 is an outline view of the handle main body 1a of the door handle 1E, which is provided at the vehicle door 2 as illustrated in FIG. 1, when viewed in a direction orthogonal to the vehicle door 2. Illustrated in FIG. 20 is a top view of the handle main body 1a of the door handle 1E. Further, illustrated in FIG. 20 is an outline view of the handle main body 1a, which is provided at the vehicle door 2 as illustrated in FIG. 1, when being viewed from a side of the vehicle door 2 (i.e. when being viewed towards the vehicle door 2).

In the fifth embodiment, the optical fiber 6, which includes the first end portion 6b connected to the optical connector 7 and the second end portion 6c, is wired in a manner where being inserted into the handle main body 1a from the hinge portion 1d towards the outer surface of the handle main body 1a so as to across the handle main body 1a to extend towards and be exposed at the outer surface of the handle main body 1a, so that the optical fiber 6 penetrates through the handle main body 1a and being exposed to the outside of the vehicle. The exposed optical fiber 6 is further wired so as to extend towards the arm portion 1e along the outer surface of the handle main body 1a in the longitudinal direction thereof. The optical fiber 6 is returned to the inside of the handle main body 1a in the vicinity of the arm portion 1e. A light diffusing portion 1h is provided at the handle main body 1a so as to face the door panel 3. The second end portion 6c of the optical fiber 6, which returns into the handle main body 1a, is connected to the light diffusing portion 1h. The optical sensor portion 15 is provided in the vicinity of the light diffusing portion 1h, more specifically, the optical sensor portion 15 is provided in the vicinity of substantially center portion of the light diffusing portion 1h in the longitudinal direction of the handle main body 1a. The light diffusing portion 1h is provided at the inner surface of the handle main body 1a so as to be positioned between the door panel 3 and the optical sensor portion 15. The light, which is diffused by the light diffusing portion 1h, is inputted into the optical sensor portion 15 as the detection light. Additionally, the light diffused by the light diffusing portion 1h serves also as the decorative light for informing the user of the state of the door handle 1E by lighting a space formed between the door handle 1E and the door panel 3.

Figure 21:
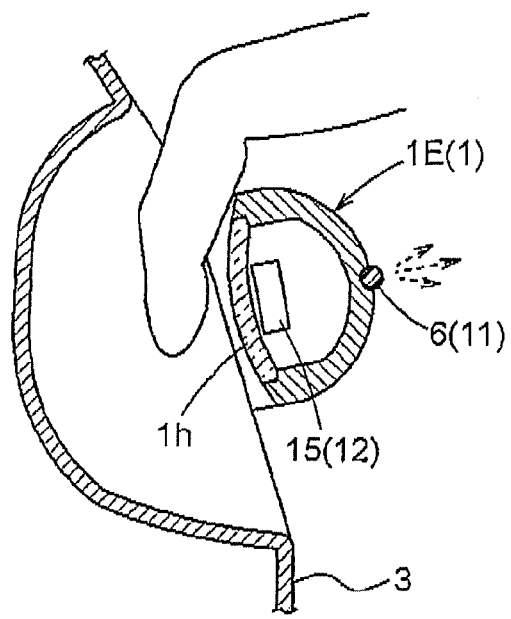
FIG. 21 is a view for explaining an example of detecting the manual operation by the user in the fifth embodiment.

The light, which leaks from the light leakage zone 6a of the optical fiber 6 provided at the surfaces of the handle main body 1a, serves as the illumination for the door handle 1E. In other words, the light leakage zone 6a of the optical fiber 6 functions as the informing portion 11. The light diffusing portion 1h serves as the informing portion 11 and the operation detecting portion 12. Illustrated in FIG. 21 is a view for explaining an example of the operation detecting portion 12 detecting the manual operation by the user. When the user puts his/her hand (finger) on the door handle 1E, the light, which is emitted towards the door panel 3 from the light diffusing portion 1h, is blocked by the user's hand, and the light is reflected by the user's hand. The reflected light returns to the light diffusing portion 1h. Then, the reflected light, returning to the light diffusing portion 1h, is inputted into the optical sensor portion 15, which is provided at a position opposite to the door panel 3 relative to the light diffusing portion 1h. Accordingly, in this case, the amount of light reaching the optical sensor portion 15 increases, and therefore, the amount of charge, which is generated by converting the light into the electricity by the light receiving element 15a, also increases. The sensor circuit 15b outputs the detection signal in response to the amount of charge. Accordingly, the system ECU 41 determines, on the basis of the detection signal whether or not the manual operation is performed by the user.

Figure 22:
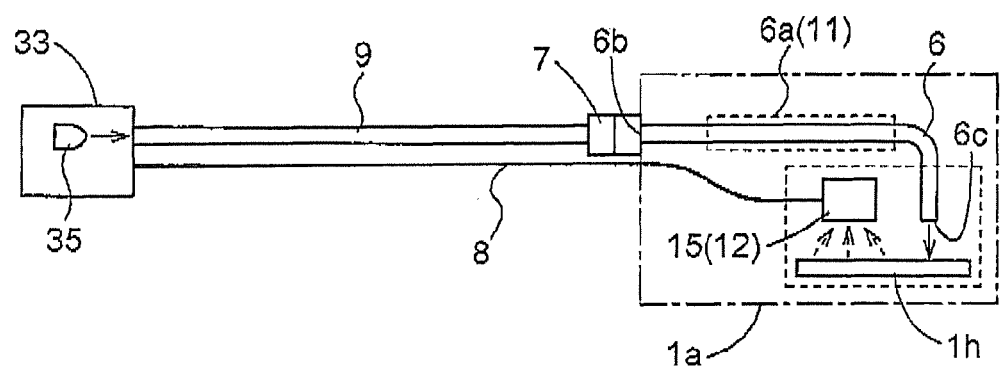
FIG. 22 is a block diagram schematically illustrating and example of a functional configuration of the door handle apparatus for the vehicle.

Illustrated in FIG. 22 is a block diagram schematically illustrating an example of a functional configuration of the door handle 1E. The functional configuration of the door handle 1E of the fifth embodiment differs from the functional configuration of the door handle 1A of the first embodiment, which is illustrated in FIG. 5, in a relationship between the optical fiber 6 and the optical sensor portion 15. In the first embodiment, as illustrated in FIG. 5, the light, which is outputted from the second end portion 6c of the optical fiber 6, is directly inputted into the optical sensor portion 15. On the other hand, in the fifth embodiment, as illustrated in FIG. 22, the light (the detection light) outputted from the second end portion 6c of the optical fiber 6 is indirectly inputted into the optical sensor portion 15. In the fifth embodiment, the light, which is diffused by the light diffusing portion 1h, is indirectly inputted into the optical sensor portion 15 while the door handle 1E is in the non-operated state. On the other hand, when the door handle 1E turns to be in the operated state, i.e. when the door handle 1E is manually operated by the user, the light, which is reflected by the user's hand, is inputted into the optical sensor portion 15.

A process for the unlocking control in a case where the unlocking control of the locking system is adapted to the door handle 1E of the fifth embodiment is substantially the same as the case of the first embodiment. Therefore, the detailed explanation about the process for the unlocking control will be omitted.

Sixth Embodiment

Figure 23:
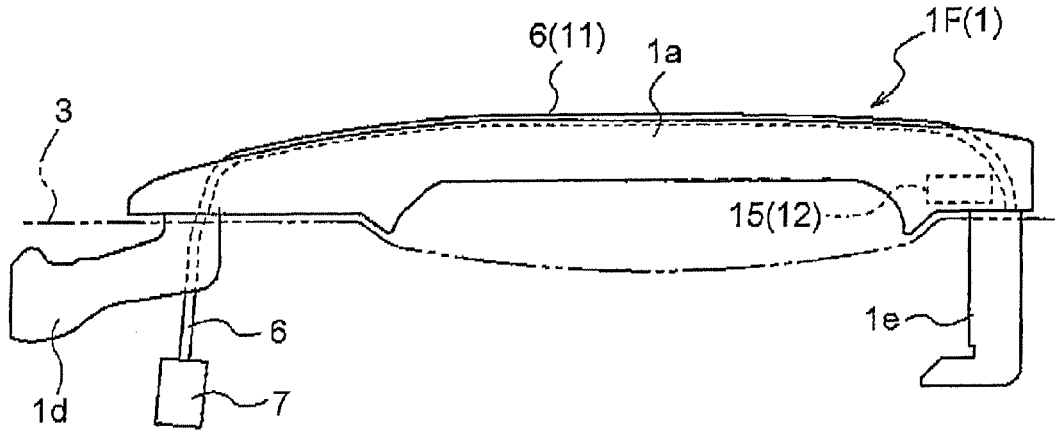
FIG. 23 is a side view of a door handle apparatus for a vehicle according to a sixth embodiment.
Figure 24:
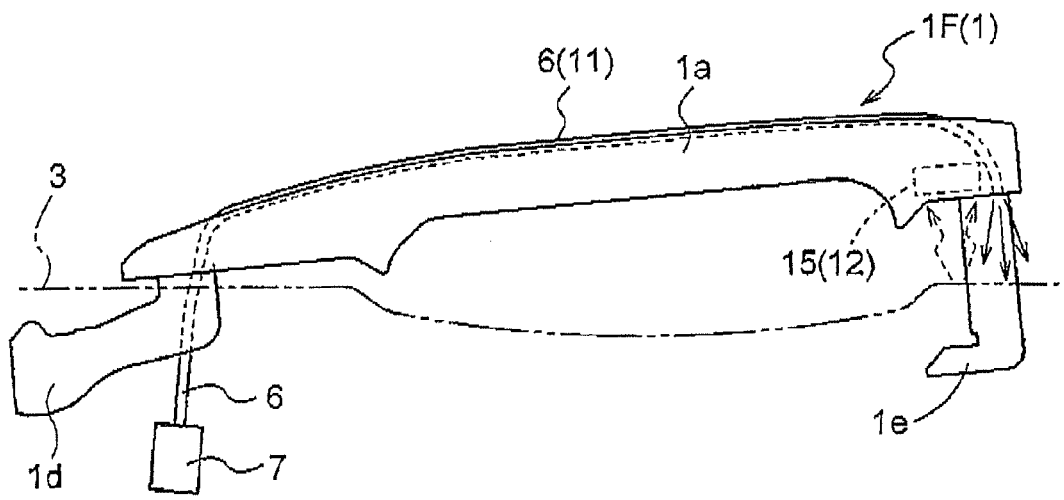
FIG. 24 is a view for explaining an example of detecting the manual operation by the user in the sixth embodiment.

A sixth embodiment of the door handle 1 for the vehicle will be described below. The same components, parts, functions and the like with the above-described embodiments will be omitted here. Illustrated in FIG. 23 is a side view of the door handle main body 1a of a door handle 1F (the door handle 1) relating to the sixth embodiment. Further, illustrated in FIG. 23 is an outline view of the handle main body 1a of the door handle 1F, which is provided at the vehicle door 2 as illustrated in FIG. 1, when viewed in a direction orthogonal to the vehicle door 2. An outline view of the handle main body 1a, which is provided at the vehicle door 2 as illustrated in FIG. 1, when being viewed from a side of the vehicle door 2 (i.e. when being viewed towards the vehicle door 2), is omitted. Illustrated in FIG. 24 is a side view of the door handle 1F for explaining about detecting the manual operation by the user.

In the sixth embodiment, the optical fiber 6, which includes the first end portion 6b connected to the optical connector 7 and the second end portion 6c, is wired in a manner where being inserted into the handle main body 1a from the hinge portion 1d towards the outer surface of the handle main body 1a so as to across the handle main body 1a, so that the optical fiber 6 penetrated the handle main body 1a and being exposed to the outside of the vehicle. The exposed optical fiber 6 is further wired so as to extend along the outer surface of the handle main body 1a in the longitudinal direction thereof. The optical fiber 6 is returned into the handle main body 1a in the vicinity of the arm portion 1e. Then, the optical fiber 6 extends across the handle main body 1a in the vicinity of the arm portion 1e towards the door panel 3 of the handle main body 1a so as to penetrate therethrough. The second end portion 6c of the optical fiber 6 is exposed from the handle main body 1a, so that the light (the detection light) is emitted from the second end portion 6c of the optical fiber 6 towards the door panel 3. However, in the case where the door handle 1F is in the non-operated state, the second end portion 6c of the optical fiber 6, which is exposed from the handle main body 1a, substantially contacts the door panel 3. Therefore, the light emitted from the second end portion 6c of the optical fiber 6 is blocked by the door panel 3 while the door handle 1F is in the non-operated state.

The functional configuration of the door handle 1F of the sixth embodiment is substantially the same as the functional configuration of the door handle 1E of the fifth embodiment. More specifically, as is the case with the fifth embodiment, the light (the detection light) outputted from the second end portion 6c of the optical fiber 6 is indirectly inputted into the optical sensor portion 15. In the fifth embodiment, the light, which is diffused by the light diffusing portion 1h, and the light, which is reflected by the user's hand (finger), are indirectly inputted into the optical sensor portion 15. Similarly, in the sixth embodiment, the light, which is blocked by the door panel 3, and the light, which is reflected by the door panel 37 are indirectly inputted into the optical sensor portion 15.

When the user operates the door handle 1F so as to displace the door handle 1F, a clearance is generated between the handle main body 1a and the door panel 3. More specifically, the clearance is generated between the handle main body 1a and the door panel 3 at the side of the arm portion 1e. As described above, the light, which is emitted from the second end portion 6c of the optical fiber 6, is blocked by the door panel 3 while the door panel 1F is in the non-operated state, therefore, the detection light is hardly inputted into the optical sensor portion 15. On the other hand, when the door handle 1F is operated, blocking of the light, which is emitted from the second end portion 6c of the optical fiber 6, is released, so that the detection light, which is reflected by the door panel 3, is inputted into the optical sensor portion 15. Accordingly, the amount of light reaching the optical sensor portion 15 increases, therefore, the amount of charge, which is generated by the light receiving element 15a converting the light into the electricity, also increases. The sensor circuit 15b outputs the detection signal in response to the amount of charge. Accordingly, the system ECU 41 detects whether or not the manual operation is performed by the user on the basis of the detection signal.

In a case where the second end portion 6c of the optical fiber 6 is not completely blocked by the vehicle door 2, i.e. in a case where some of the detection light leaks while the door handle 1F is in the non-operated state, the operation to the door handle 1F by the user is detectable by comparing the detection result of the optical sensor portion of when the door handle 1F is in the non-operated state with the detection result of when the door handle 1F is operated.

A process for the unlocking control in a case where the unlocking control of the locking system is adapted to the door handle 1F of the sixth embodiment is substantially the same as the case of the first embodiment. Therefore, the detailed explanation about the process for the unlocking control will be omitted.

Overview of Fifth and Sixth Embodiments

As is the case with the door handle 1A of the first embodiment, as described above, the door handle 1 (1E, 1F) of the fifth and sixth embodiments includes the informing portion 11 for visually informing the user of the sate of the vehicle door 2, including the locking/unlocking state of the vehicle door 2, by using the decorative light, which is the visible light. Further, the door handle 1 (1E, 1F) for the vehicle includes the operation detecting portion 12 for optically detecting the active operation to the door handle 1 (1E, 1F) by the user on the basis of the changes in the detection light. The door handle 1 (1E, 1F) for the vehicle includes the optical fiber 6 (the optical waveguide), which functions as the informing portion 11 by leaking and emitting the decorative lights on the transmission path and which also functions as the operation detecting portion 12 by outputting the detection light from the second end portion 6c of the optical fiber 6, in addition to transmitting the decorative light and the detection light, which are inputted from the first end portion 6b of the optical fiber 6, to the second end portion 6c.

The door handle 1 (1E, 1F) of the fifth and sixth embodiments is configured so that the optical fiber 6 is elastically deformable in response to the external force applied thereto. Further, at least a portion of the optical fiber 6 is provided on the surface of the handle main body 1a of the door handle 1 (1E, 1F) for the vehicle. The informing portion 11 is configured by the optical fiber 6, which is provided at the surface of the handle main body 1a other than the surface thereof facing the vehicle door 2. The operation detecting portion 11 is configured so as to include the optical sensor portion 15 for receiving the reflection light, which is generated by the detection light, emitted from the second end portion 6c of the optical fiber 6, being reflected by the user or the vehicle door 2, at least while the door handle 1 (1E, 1F) is in the operated state.

According to the fifth and sixth embodiments, the informing portion and the operation detecting portion 12 are configured by the identical optical fiber 6. Accordingly, the number of components used for the door handle 1 for the vehicle is reduced. Further, the connecting line for connecting the vehicle door 2 and the door handle 1 for the vehicle does not need to be provided. In the embodiments, the optical fibers 6 and 9 and the electric wire 8 also serve as the connecting line. As a result, the door handle for the vehicle is configured by a simple structure. Furthermore, the door handle 1 for the vehicle, by which the user easily perceives the locking/unlocking state of the vehicle door 2 based on the visible light, which is leaked and emitted, is achieved. Additionally, the door handle 1A for the vehicle, which properly detects the active-direct operation by the user, is achieved by the detection light transmitted by means of the optical fiber 6.

According to the fifth and sixth embodiments, as is the case with the first, second, third and fourth embodiments, the state of the vehicle door is informed to the user outside the vehicle by using the decorative light, which is the visible light leaked and emitted from the optical fiber 6 provided at the outer surface of the handle main body 1a not facing the vehicle door 2. Furthermore, according to the fifth and sixth embodiments, unlike the first, second, third and fourth embodiments, the amount of lights inputted into the optical sensor portion 15 is changed without applying the external force for changing the cross-sectional area of the optical fiber 6. Accordingly, the door handle 1 for the vehicle, which properly detects the active operation by the user while maintaining a sense of use the user feels when operating the general door handle for the vehicle not having an optical fiber at a surface of a handle main body.

According to the fifth embodiment, the handle main body 1a includes the light diffusing portion 1h for receiving the detection light, which is emitted from the second end portion 6c of the optical fiber 6, and for diffusing the detection light, at the handle main body 1a so as to face the vehicle door 2. Furthermore, the optical sensor portion 15 is provided within the handle main body 1a at the position opposite to the vehicle door 2 relative to the light diffusing portion 1h. In other words, the optical sensor portion 15 is provided within the handle main body 1a so as to be positioned farther from the vehicle door 2 than the light diffusing portion 1h.

In the fifth embodiment, the detection light is diffused by the light diffusing portion 1h while the door handle 1E for the vehicle is in the non-operated state, therefore, the amount of light inputted into the optical sensor portion 15 is remained to be relatively small. The detection light, which is diffused by the light diffusing portion 1h and which is emitted towards the vehicle door 2, is reflected by the user's hand (finger), which is positioned between the vehicle door 2 and the door handle 1E for the vehicle, when the user operates the door handle 1E. The reflected light is incident on the optical sensor portion 15. As a result, the amount of light inputted into the optical sensor portion 15 increases, by which the operation detecting portion 12 properly detects the active operation by the user.

Further, according to the sixth embodiment, the second end portion 6c of the optical fiber 6 is blocked by the vehicle door 2 while the door handle 1F for the vehicle is in the non-operated state. The light blocked state of the second end portion 6c of the optical fiber 6 is released while the door handle 1F is in the operated state.

In the sixth embodiment, the second end portion 6c of the optical fiber 6 may be closely contacted to the vehicle door 2 by the biasing force while the door handle 1F for the vehicle is in the non-operated state. In this case, the detection light inputted into the optical sensor portion 15 becomes approximately zero (0). On the other hand, when the door handle 1F for the vehicle is operated by the user, the detection light is inputted into the optical sensor portion 15. Accordingly, the optical sensor portion 15 is capable of detecting the operation to the door handle 1F by the user with reference to the state where the amount of light is approximately zero (0), i.e. by comparing the amount of light of when the door handle 1F is in the non-operated state with the amount of the light of when the door handle 1F is operated by the user. Accordingly, the operation detecting portion properly detects the active operation by the user.

Seventh Embodiment

Figure 25:
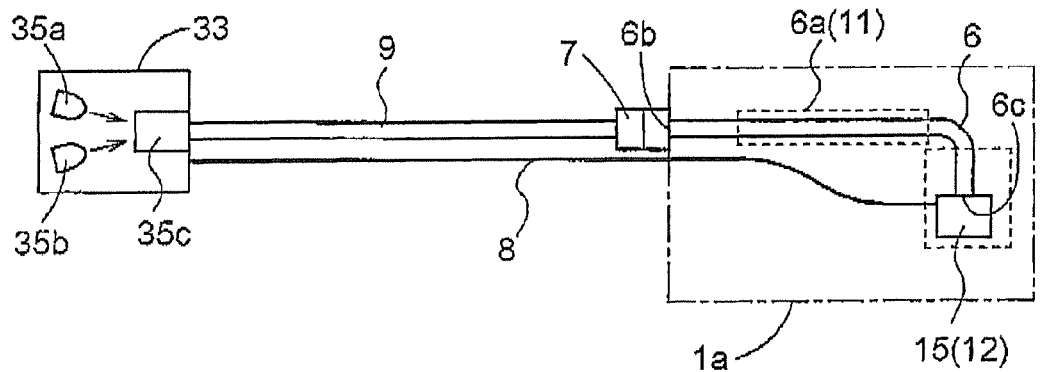
FIG. 25 is a block diagram schematically illustrating an example of a functional configuration of a door handle apparatus for a vehicle according to a seventh embodiment.

A seventh embodiment of the door handle 1 for the vehicle will be described below. Illustrated in FIG. 25 is a block diagram schematically illustrating an example of a functional configuration of the door handle 1 according to the seventh embodiment. The configuration example of the seventh embodiment is adaptable to the door handle 1 of the first, second, third and fourth embodiments. Additionally, the technical idea of the seventh embodiment is adaptable to the fifth and sixth embodiments. More specifically, the configuration example of the door handle 1 according to the seventh embodiment is achievable by modifying a relationship between the second end portion 6c of the optical fiber 6 and the optical sensor portion 15 of the door handle 1 (1E, 1F) of the fifth and sixth embodiments to a relationship illustrated in FIG. 22.

In the above-described embodiments, the identical lights having the same wavelength, which are emitted from the light-emitting source 35, is used for the decorative light, which is used in the informing portion, and the detection light, which is used in the operation detecting portion 12. However, as illustrated in FIG. 25, lights having different wavelengths, i.e. a light emitted from a first light-emitting source 35a and a light emitted from a second light-emitting source 35b, may be used for the informing portion 11 and the operation detection portion 12, respectively. The two (plural) lights having different wavelengths, emitted from the respective two (plural) light-emitting sources, are photosynthesized by a photosynthetic apparatus 35c, so that the photosynthesized light is inputted to the optical fiber 6 from the first end portion 6b thereof.

The first light-emitting source 35a emits the light used at the informing portion 11, therefore, the light in the visible region needs to be emitted from the first light-emitting source 35a. The second light-emitting source 35b emits the light used at the operation detecting portion 12, therefore, the light emitted by the second light-emitting source 35b is not limited to the light in the visible region. It should be understood, however, that the second light-emitting source 35b may be modified so as to emit the light in the visible region. For example, a red LED may be used for the first light-emitting source 35a, while, a yellow LED or a blue LED is used for the second light-emitting source 35b. For example, it may be preferable if the first light-emitting source 35a is used to output the light whose wavelength is in the visible range and is used for the informing portion 11, while the second light-emitting source 5b is used to output the light whose wavelength is in the infrared region and is used for the operation detecting portion 12. Various types of the receiving element, having sensitivity against the wavelength in the infrared region, are mass-produced for the remote controller at a relatively low price. Such receiving elements are suitable for the receiving element 15a for receiving the detection light to be used at the operation detection portion 12, because the receiving element has high sensitivity and tolerance against disturbance.

Eighth Embodiment

An eighth embodiment of the door handle 1 for the vehicle will be described below. The door handle 1 of the eighth embodiment further includes a malfunction detecting portion, in addition to the elements and components disclosed in the first second, third, fourth, fifth, sixth and seventh embodiments. For example, the malfunction detecting portion is realized by the system ECU 41, the vehicle exterior interface 33, the light source 35 and the optical sensor portion 15 of the operation detecting portion 12 in cooperation.

The system ECU 41 regularly intermittently turn on the light source 35 independently of the communication with the portable device 5 and the authentication of the portable device 5. Then, a current consumption of the light source 35 when being turned on, is measured, which is fed-back to the system ECU 41. The system ECU 41 detects a malfunction (a failure) of the light source 35 by comparing a measured value with a predetermined reference value of the current consumption.

The vehicle door 1 of the eighth embodiment man be configured to include the malfunction detecting portion, as described below. As described above, the system ECU 41 regularly intermittently turns on the light source 35 independently of the communication with the portable device 5 and the authentication of the portable device 5. The light emitted from the light source 35 is transmitted by the optical fiber 6 and inputted into the optical sensor portion 15 of the operation detecting portion 12 via the informing portion 11. The result of the photoelectric conversion by the optical sensor portion 15 differs between when the light source 35 is turned off and when the light source 35 is turns on, because the amount of light differs between when the light source 35 is turned off and when the light source 35 is turned on. The detection result of the optical sensor portion 15 is fed-back to the system ECU 41, so that the system ECU 41 determines whether or not a malfunction occurs at the light source 35, the optical fiber 6, the optical sensor portion 15 and the like.

In the case where the LED is used for the light source 35, the malfunction is unlikely to occur at the light source 35. In a case where the malfunction occurs at the optical sensor portion 15, the current consumption may increase or decrease depending on the electric wiring, or the detection signal may turn to be in a floating state, therefore, the malfunction of the optical sensor portion 15 is detectable by the system ECU 41. The optical fiber 6, which is provided at the vehicle door 2 and which is likely to be exposed, has possibility of causing a malfunction, such as wire breakage and the like, when comparing with the light source 35. By providing the malfunction detecting portion for detecting the malfunction of at least the informing portion 11, such as the wire breakage of the optical fiber 6 and the like, a reliability of the door handle 1 for the vehicle is improved. Furthermore, because the malfunction detecting portion is configured by using the operation detecting portion 12 (the optical sensor portion 15), an additional function is provided to the door handle 1 without any additional components.

A malfunction detecting circuit does not need to be provided to the informing portion 11, because the light emitted from the light source 35 is transmitted via the optical fiber 6, which serves as the informing portion 11 and the operation detecting portion 12. Therefore, the door handle 1 for the vehicle having plural functions, such as the functions as the informing portion 11 and the operation detecting portion 12, is achieved while realizing a downsize of the door handle 1 for the vehicle, and while simplifying the wiring.

Modified embodiments of the door handle 1 for the vehicle according to the above-described embodiments will be explained below. The door handle 1 for the vehicle according to the modified embodiments differs from the door handle 1 for the vehicle according to the above-described embodiments in that the informing portion 11 and the operation detecting portion 12 are not configured by the identical optical fiber 6. The modified embodiments, which are conceivable from the above-described embodiments, will be described below.

First Modified Embodiments

Figure 26:
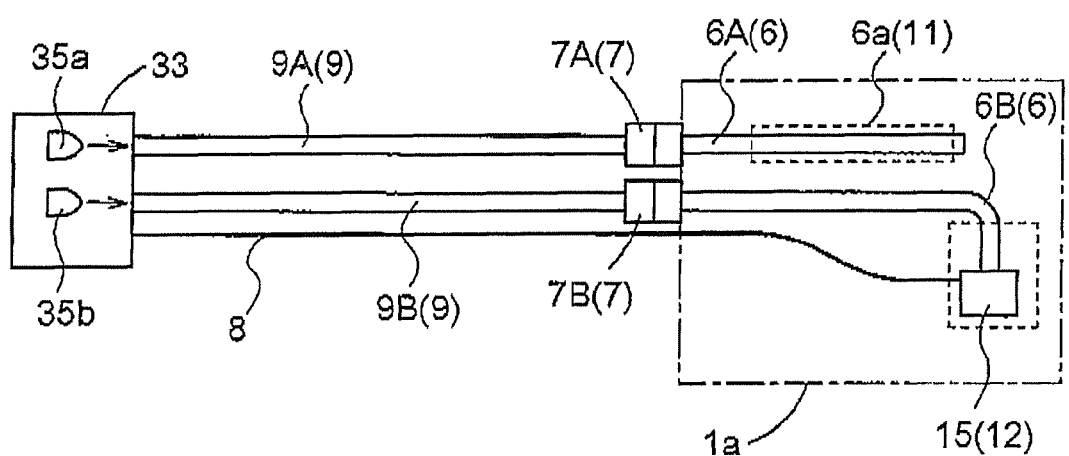
FIG. 26 is a block diagram schematically illustrating an example of a functional configuration of a door handle apparatus for a vehicle according to a first modified embodiment.

A first modified embodiment of the door handle 1 for the vehicle will be described below. Illustrated in FIG. 26 is a block diagram schematically illustrating an example of a functional configuration of the door handle 1 relating to the first modified embodiment. The configuration example is derived from the first, second, third and fourth embodiments.

Furthermore, the configuration example of the first modified embodiment is derived from the fifth and sixth embodiments, by modifying a relationship between second end portion 6c of the optical fiber 6 and the optical sensor portion 15 of the fifth and sixth embodiment to the relationship illustrated in FIG. 22.

As is the case with the seventh embodiment, in this first modified embodiment, the decorative light, which is used for the informing portion 11, and the detection light, which is used for the operation detecting portion 12, have different wavelengths, which are emitted from the first light-emitting source 35a and the second light-emitting source 35b, respectively. However, the two lights having, different wavelengths and being emitted from the respective two light sources, are not photosynthesized by the photosynthetic apparatus 35c. The two lights having different wavelengths are transmitted to the informing portion 11 and the operation detecting portion 12, respectively by using two optical fiber. More specifically, for example, the decorative light is transmitted to the forming portion 11 via a first optical fiber 9A, a first optical connector 7A and a first optical fiber 6A. The detection light is transmitted to the operation detecting portion 12, via, for example, a second optical fiber 9B, a second optical connector 7B and a second optical fiber 6B.

Second Modified Embodiment

Figure 27:
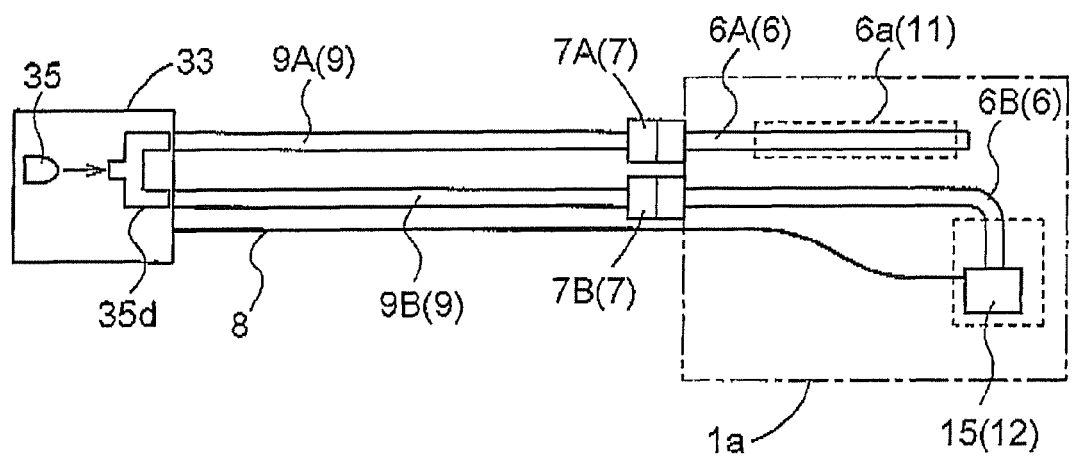
FIG. 27 is a block diagram schematically illustrating an example of a functional configuration of a door handle apparatus for a vehicle according to a second modified embodiment.

A second modified embodiment of the door handle 1 for the vehicle will be described below. Illustrated in FIG. 27 is a block diagram schematically illustrating an example of a functional configuration of the door handle 1 relating to the second modified embodiment. The door handle 1 of the second modified embodiment is derived from the first, second, third and fourth embodiments. Furthermore, the configuration example is derived from the fifth and sixth embodiments, by modifying a relationship between the second end portion 6c of the optical fiber 6 and the optical sensor portion 15 to the relationship as illustrated in FIG. 22.

As is the case with the eighth embodiment, in the second modified embodiment, the decorative light and the detection light are transmitted to the informing portion 11 and the operation detecting portion 12 by two optical fibers, respectively. However, the door handle 1 of the second modified embodiment differs from the door handle 1 of the eighth embodiment in that the lights emitted from the first light-emitting source 35a and the second light-emitting source 35b have the same wavelength as the light emitted from the identical light source 35. The light emitted from the identical light source 35 is separated by a light separator 35d, so that the separated lights are transmitted to the informing portion 11 and the operation detecting portion 12 via two optical fibers, respectively. More specifically, for example, the decorative light is transmitted to the informing portion 11 via the first optical fiber 9A, the first optical connector 7A and the first optical fiber 6A. The detection light is transmitted to the operation detecting portion 12 via the second optical fiber 9B, the second optical connector 7B and the second optical fiber 6B.

As described in the above embodiments, the door handle for the vehicle, by which the user easily perceives the locking/unlocking state of the vehicle door and which properly detects the active-direct operation by the user, is achieved by a simple configuration. As is evident from the above-described embodiments, the wiring path of the optical fiber is modified to any desirable wiring path. Any modifications, changes and the like are adaptable to the door handle for the vehicle without departing from the spirit of the present invention.

Accordingly, the identical optical fiber 6 is used for configuring the informing portion 11 for informing the control state of the vehicle door 2 by means of the decorative light and the operation detecting portion 12 for detecting the active-direct operation to the door handle 1 for the vehicle by the user. As a result, the number of components used for the door handle 1 for the vehicle is reduced. Further, the door handle 1 for the vehicle does not need to include the connecting line for connecting the vehicle door 2 and the door handle 1 for the vehicle. As a result, the door handle 1 for the vehicle is configured by a simple structure. More specifically, the door handle 1 for the vehicle by which the user easily and visually perceives the locking/unlocking state of the vehicle door 2 is achieved by the visible light, which is emitted and leaked. Moreover, the door handle 1 for the vehicle, which properly detects the active operation by the user, is achieved by using the detection light which is transmitted through the optical fiber 6.

According to the embodiments, the optical fiber 6 is formed so as to be elastically deformable in response to an external force applied thereto and so that at least a portion of the optical fiber 6 is provided at the surface of the handle main body 1a of the door handle 1 for the vehicle. The informing portion 11 is configured by the optical fiber 6 provided at the outer surface of the handle main body 1a. Furthermore, the operation detecting portion 12 is configured so as to include the operation inputting portion, which is configured by the optical fiber 6 whose cross-sectional area changes in response to the active-direct operation by the user, and the optical sensor portion 15 for receiving the detection light, which is outputted from the second end portion 6c of the optical fiber 6.

In the case where the optical fiber 6 is provided at the outer surface of the handle main body 1a other than the inner surface thereof facing the vehicle door 2, the state of the vehicle door 2 is clearly informed to the user outside the vehicle by using the decorative light, which is the visible light leaked on the transmission path so as to be outwardly emitted. Further, the optical fiber 6 is formed to as to be elastically deformable so that the cross-sectional area of the optical fiber changes in response to the active-direct operation thereto by the user, which results in changing the amount of detection light to be transmitted. Accordingly, the active-direct operation by the user is properly detected by detecting the changing amount of light inputted to the optical sensor portion 15.

According to the embodiments, the optical fiber 6, functioning as the operation inputting portion of the operation detecting portion 12, is provided at the inner surface of the handle main body (1a), which faces the vehicle door 2 and which differs from the outer surface.

The user is likely to hold the door handle 1 for the vehicle with his/her hand (finger) when operating the door handle 1 for the vehicle. In this case, the user's hand (i.e. the end portion of the user's finger), by which a relatively strong operating force is applied to the door handle 1 for the vehicle, is positioned between the vehicle door 2 and the door handle 1 for the vehicle. Therefore, by providing the optical fiber 6, which serves as the operation inputting portion, at the inner surface of the handle main body 1a facing the vehicle door 2, the operation detecting portion 12 properly detects the external force applied to the door handle 1 by the operation of the user. As a result, the operation detecting portion 12 properly detects the active-direct operation by the user.

According to the embodiments, the handle main body 1a includes the case portion 1j having the opening portion opening towards the vehicle door 2 in the state where the handle main body 1a is attached to the vehicle door 2 and the back cover 1f covering the opening, being provided so as to be displaceable towards the inner side of the case position 1j from the neutral position in response to the operation by the user and having the plural protruding portions 1g protruding towards the inner side of the case portion 1j. Furthermore, the optical fiber 6, functioning as the operation inputting portion, is provided within the handle main body 1a in the state where the optical fiber 6 is held between the case portion 1j and the plural protruding portions 1g of the cover portion 1f.

Accordingly, in the case where the user holds the door handle 1 for the vehicle, the optical fiber is not directly touched or pressed by the user with his/her hand or finger. Therefore, the user may operate the door handle 1 for the vehicle without feeling discomfort at his/her hand or finger. As described above, the user is likely to perform operation of holding the door handle 1 for the vehicle with his/her hand or finger in the case where the user operates the door handle 1 for the vehicle. In this case, the user's hand (i.e. the end portion of the user's finger), by which a relatively strong operating force is applied to the door handle 1 for the vehicle, is likely to be positioned between the vehicle door 2 and the door handle 1 for the vehicle. The optical fiber 6, which serves as the operation inputting portion, is provided within the handle main body 1a in the state where the optical fiber 6 is held between the protruding portions 1g of the back cover 1f, which is provided at the door handle 1 (1B, 1C, 1D) for the vehicle so as to face the vehicle door 2, and the case portion 1j. Accordingly, the optical fiber 6, which serves as the operation detecting portion 12, properly receives the external force applied to the door handle 1 for the vehicle by the user's operation. As a result, the operation detecting portion 12 properly detects the active-direct operation to the door handle 1 (1B, 1C, 1D) for the vehicle by the user.

According to the embodiments, the vehicle door 2 includes the projecting portion (3a, 3b), which is pressed against the door handle apparatus 1 for the vehicle while being in the non-operated state. The optical fiber 6, functioning as the operation inputting portion, is held between the door handle 1 for the vehicle and the projecting portion (3a, 3b) of the vehicle door 2 while the door handle 1 for the vehicle is in the non-operated state. Furthermore, the optical fiber 6 is released from being held between the door handle 1 for the vehicle and the projecting portion (3a, 3b) of the vehicle door 2 while the door handle 1 for the vehicle is in the operated state.

Accordingly, in the case where the user holds the door handle 1 for the vehicle, the optical fiber is not directly touched or pressed by the user with his/her hand or finger. Therefore, the user may operate the door handle 1 for the vehicle without feeling discomfort at his/her hand or finger. In the case where the door handle 1 (1B, 1C, 1D) for the vehicle is in the non-operated state, the cross-sectional area of the optical fiber 6 is reduced because the optical fiber 6 receives the compressive force generated by the biasing force applied to the optical fiber 6. Therefore, in the case where the door handle 1 (1B, 1C, 1D) for the vehicle is in the non-operated state, the amount of the detection light, which transmits through the optical fiber 6 and which is inputted into the optical sensor portion 15, becomes smaller. On the other hand, when the user operates the door handle 1 (1B, 1C, 1D) for the vehicle, the optical fiber 6 is released from the compressive force applied thereto, therefore, the cross-sectional area of the optical fiber 6 increases, thereby increasing the amount of the detection light inputted into the optical sensor portion 15. The optical sensor portion 15 detects the operation to the door handle 1 (1B, 1C, 1D) for the vehicle by the user, on the basis of the difference between the amount of light inputted into the optical sensor portion 15 in the case where the door handle 1 (1B, 1C, 1D) for the vehicle is in the non-operated state and the amount of the light inputted into the optical sensor portion 15 in the case where the door handle 1 (1B, 1C, 1D) for the vehicle is in the operated state. Alternatively, the door handle 1 (1B, 1C, 1D) for the vehicle may be modified so that the optical fiber 6 is elastically compressed by the biasing force applied thereto while the door handle 1 (1B, 1C, 1D) for the vehicle is in the non-operated state. In this case, the detection light inputted into the optical sensor portion 15 becomes approximately zero (0) while the door handle 1 (1B, 1C, 1D) for the vehicle is in the non-operated state. On the other hand, when the user operates the door handle 1 (1B, 1C, 1D) for the vehicle, the detection light is inputted into the optical sensor portion 15. Therefore, the optical sensor portion 15 detects the operation to the door handle 1 (1B, 1C, 1D) for the vehicle by comparing the amount of the detection light of when the door handle 1 for the vehicle is in the non-operated state (i.e. the amount of the detection light is approximately zero (0)) with the amount of the detection light received when the door handle 1 for the vehicle is in the operated state. As a result, the operation detecting portion 12 properly detects the active operation to the door handle 1 for the vehicle by the user.

According to the embodiments, the optical fiber 6 is formed so as to be elastically deformable in response to the external force applied thereto and so that at least a portion of the optical fiber 6 is provided at the surface of the handle main body 1a of the door handle 1 for the vehicle. The informing portion 11 is configured by the optical fiber 6 provided at the outer surface of the handle main body 1a. Furthermore, the operation detecting portion 12 is configured so as to include the optical sensor portion 15 for receiving the reflected light, generated by the detection light, which is emitted from the second end portion 6c of the optical fiber 6 towards the vehicle door 2, being reflected by the user or by the vehicle door 2, in the case where at least the door handle 1 for the vehicle is in the operated state.

Accordingly, by providing the optical fiber 6 at the outer surface of the handle main body 1a other than the inner surface thereof facing the vehicle door 2, the state of the vehicle door 2 is clearly informed to the user staying outside of the vehicle by using the decorative light, which is the visible light leaked and emitted on the transmission path. Additionally, the amount of light inputted into the optical sensor portion 15 is changed without applying the external force for changing the cross-sectional area of the optical fiber 6 to the optical fiber 6. Accordingly, the door handle 1 for the vehicle, which properly detects the active operation by the user while maintaining the sense of use the user feels when operating the general door handle for the vehicle not having the optical fiber at the surface of the handle main body, is achieved.

According to the embodiments, the handle main body 1a includes the light diffusing portion 1h at the inner surface of the handle main body 1a facing the vehicle door 2. The light diffusing portion 1h receives the detection light, which is emitted from the second end portion 6c of the optical fiber 6 and diffuses the detection light. Furthermore, the optical sensor portion 15 is provided within the handle main body 1a so as to be positioned farther from the vehicle door 2 than the light diffusing portion 1h.

Accordingly, the detection light is diffused by the light diffusing portion 1h while the door handle 1 (1E) for the vehicle is in the non-operated state, therefore, the amount of light inputted into the optical sensor portion 15 is reduced to a relatively smaller amount. As described above, the user is likely to hold the door handle 1 for the vehicle with his/her hand (finger) when the user operates the door handle 1 for the vehicle. In this case, the user's hand (i.e. the end portion of the user's finger), by which relatively strong operating force is applied to the door handle 1 for the vehicle, is likely to be positioned between the vehicle door 2 and the door handle 1 for the vehicle. The detection light, which is diffused by the light diffusing portion 1b and which is emitted towards the vehicle door 2, is reflected by the user's hand or finger, so that the reflected light is incident on the optical sensor portion 15. As a result, the amount of light inputted into the optical sensor portion 15 increases. Accordingly, the operation detecting portion 12 properly detects the active-direct operation to the door handle 1 for the vehicle by the user.

According to the embodiments, the detection light emitted from the second end portion 6c of the optical fiber 6 is blocked by the vehicle door 2 while the door handle 1 for the vehicle is in the non-operated state. Furthermore, the light emission from the second end portion 6c of the optical fiber 6 is released from being blocked while the door handle 1 for the vehicle is in the operated state.

Accordingly, the vehicle door 1 (1F) for the vehicle may be modified so that the second end portion 6c of the optical fiber 6 closely contacts the vehicle door 2 by the biasing force while the door handle 1 (1F) for the vehicle is in the non-operated state. In this case, the detection light inputted into the optical sensor portion 15 becomes approximately zero (0) in the case where the door handle 1 (1F) for the vehicle is in the non-operated state. On the other hand, when the user operates the door handle 1 (1F) for the vehicle, the detection light is inputted into the optical sensor portion 15. Accordingly, the optical sensor portion 15 detects the operation to the door handle 1 (1F) for the vehicle by the user by comparing the amount of light inputted into the optical sensor portion 15 when the door handle 1 (1F) for the vehicle is in the non-operated state (i.e. the amount of light being approximately zero (0)) with the amount of light inputted into the optical sensor portion 15 when the door handle 1 (1F) for the vehicle is in the operated state. As a result, the door handle 1 (1F) for the vehicle properly detects the active operation by the user. Additionally, even in the case where the second end portion 6c of the optical fiber 6 is not completely blocked by the vehicle door 2, in other words, in the case where some of the detection light is leaked while the door handle 1 (1F) for the vehicle is in the non-operated state, the operation to the door handle 1 (1F) for the vehicle is detected by comparing the detection result of the optical sensor portion 15 of when the door handle 1 (1F) for the vehicle is operated with the detection result of the optical sensor portion 15 of when the door handle 1 (1F) for the vehicle is not operated.

According to the embodiments, the decorative light and the detection light, which are inputted into the optical fiber 6 from the first end portion 6b thereof have the same wavelength, which is emitted from a single light source 35.

Accordingly, the door handle 1 for the vehicle is configured with a simple structure.

According to the embodiments, the decorative light and the detection light are lights having different wavelengths, which are emitted from different light sources (35a, 35b), respectively. Then, the wavelengths of the decorative light and the detection light are photosynthesized and inputted into the optical fiber 6 from the first end portion 6b thereof.

Accordingly, the door handle 1 for the vehicle, which has functions of informing the user of the state of the vehicle door 2 by using the decorative light, which is the visible light having a color suitable for illumination, and detecting the operation by the user by using the detection light, which is the light having the wavelength suitable for sensing, is achieved by the simple configuration.

According to the embodiments, the door handle 1 for the vehicle further includes the malfunction detecting portion for detecting the malfunction of at least the informing portion 11. The malfunction detecting portion is configured by using the operation detecting portion 12.

Accordingly, the decorative light and the detection light are transmitted to the operation detecting portion 12 through the optical fiber 6 via the informing portion 11. The amount of light of when the light source 35, which outputs the decorative light and the detection light, is turned on differs from the amount of light of when the light source 35 is turned off, therefore, the detection results also differ between when the light source 35 is turned on and when the light source 35 is turned off. If the malfunction, such as the wire breakage and the like, occurs at the optical fiber 6, the decorative light or the detection light may not be transmitted to the informing portion 11 or the second end portion 6c of the optical fiber 6 even if the decorative light or the detection light is inputted into the optical fiber 6 from the first end portion 6b thereof. Therefore, the detection result of the operation detecting portion 12 when the malfunction occurs at the optical fiber 6 becomes substantially the same as when the decorative light and the detection light are not inputted from the first end portion 6b of the optical fiber 6, i.e. when, for example, the light source 35 is turned off. Accordingly, the malfunction of the informing portion 11, which is configured by the optical fiber 6, becomes detectable on the basis of the detection result of the operation detecting portion 12. As a result, the door handle 1 for the vehicle having plural functions, such as the functions as the informing portion 11 and the operation detecting portion 12, is achieved while achieving the downsize of the door handle 1 for the vehicle, furthermore, the wiring is also simplified.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A door handle apparatus for opening and closing a vehicle door, the door handle apparatus comprising:

an informing portion for visually informing a state of the vehicle door, including a locking/unlocking state of the vehicle door, to a user by using a decorative light;

an operation detecting portion for optically detecting an active-direct operation to the door handle apparatus by the user on the basis of changes in an detection light; and an optical waveguide for transmitting the decorative light and the detection light, which are inputted from a first end portion of the optical waveguide, to a second end portion of the optical waveguide, the optical waveguide functioning as the informing portion by leaking the decorative light on a transmission path so as to be outwardly emitted and as the operation detecting portion by outputting the detection light from the second end portion of the optical waveguide;

wherein the optical waveguide is formed so as to be elastically deformable in response to an external force applied thereto and so that at least a portion of the optical waveguide is provided at a surface of a handle main body of the door handle apparatus for the vehicle, the informing portion is configured by the optical waveguide provided at a first surface of the handle main body, and wherein the operation detecting portion is configured so as to include an operation inputting portion, which is configured by the optical waveguide whose cross-sectional area changes in response to the active-direct operation by the user, and an optical sensor portion for receiving the detection light, which is outputted from the second end portion of the optical waveguide.

2. The door handle apparatus according to claim 1, wherein the optical waveguide, functioning as the operation inputting portion of the operation detecting portion, is provided at a second surface of the handle main body, which faces the vehicle door and which differs from the first surface.

3. The door handle apparatus according to claim 1, wherein the handle main body includes a case portion having an opening portion opening towards the vehicle door in a state where the handle main body is attached to the vehicle door and a cover portion covering the opening, being provided so as to be displaceable towards an inner side of the case position from a neutral position in response to the operation by the user and having a protruding portion protruding towards the inner side of the case portion, and wherein the optical waveguide, functioning as the operation inputting portion, is provided within the handle main body in a state where the optical waveguide is held between the case portion and the protruding portion of the cover portion.

4. The door handle apparatus according to claim 1, wherein the vehicle door includes a projecting portion, which is pressed against the door handle apparatus for the vehicle while the door handle apparatus for the vehicle is in a non-operated state, the optical waveguide, functioning as the operation inputting portion, is held between the door handle apparatus for the vehicle and the projecting portion of the vehicle door while the door handle apparatus for the vehicle is in the non-operated state, and wherein the optical waveguide is released from being held between the door handle apparatus for the vehicle and the projecting portion of the vehicle door while the door handle apparatus for the vehicle is in an operated state.

5. The door handle apparatus according to claim 1, wherein the decorative light and the detection light, which are inputted into the optical waveguide from the first end portion thereof have the same wavelength, which is emitted from a single light-emitting source.

6. The door handle apparatus according to claim 1, wherein the decorative light and the detection light are lights having different wavelengths, which are emitted from different light-emitting sources, respectively, and wherein the wavelengths of the decorative light and the detection light are photosynthesized and inputted into the optical waveguide from the first end portion thereof.

7. The door handle apparatus according to claim 1, further comprising a malfunction detecting portion for detecting a malfunction of at least the informing portion, wherein the malfunction detecting portion is configured by using the operation detecting portion.

8. A door handle apparatus for opening and closing a vehicle door, the door handle apparatus comprising:
an informing portion for visually informing a state of the vehicle door, including a locking/unlocking state of the vehicle door, to a user by using a decorative light;
an operation detecting portion for optically detecting an active-direct operation to the door handle apparatus by the user on the basis of changes in an detection light; and
an optical waveguide for transmitting the decorative light and the detection light, which are inputted from a first end portion of the optical waveguide, to a second end portion of the optical waveguide, the optical waveguide functioning as the informing portion by leaking the decorative light on a transmission path so as to be outwardly emitted and as the operation detecting portion by outputting the detection light from the second end portion of the optical waveguide;
wherein the optical waveguide is formed so as to be elastically deformable in response to an external force applied thereto and so that at least a portion of the optical waveguide is provided at a surface of a handle main body of the door handle apparatus for the vehicle, the informing portion is configured by the optical waveguide provided at a first surface of the handle main body, and wherein the operation detecting portion is configured so as to include an optical sensor portion for receiving a reflected light, generated by the detection light, which is emitted from the second end portion of the optical waveguide towards the vehicle door, being reflected by the user or by the vehicle door, in a case where at least the door handle apparatus for the vehicle is in an operated state.

9. The door handle apparatus according to claim 8, wherein the handle main body includes a light diffusing portion at a second surface of the handle main body, the second surface is a surface of the handle main body facing the vehicle door and being different from the first surface, the light diffusing portion receives the detection light, which is emitted from the second end portion of the optical waveguide and diffuses the detection light, and wherein the optical sensor portion is provided within the handle main body so as to be positioned farther from the vehicle door than the light diffusing portion.

10. The door handle apparatus according to claim 8, wherein the detection light emitted from the second end portion of the optical waveguide is blocked by the vehicle door while the door handle apparatus for the vehicle is in a non-operated state, and wherein the light emission from the second end portion of the optical waveguide is released from being blocked while the door handle apparatus for the vehicle is in the operated state.

11. The door handle apparatus according to claim 8, wherein the decorative light and the detection light, which are inputted into the optical waveguide from the first end portion thereof have the same wavelength, which is emitted from a single light-emitting source.

12. The door handle apparatus according to claim 8, wherein the decorative light and the detection light are lights having different wavelengths, which are emitted from different light-emitting sources, respectively, and wherein the wavelengths of the decorative light and the detection light are photosynthesized and inputted into the optical waveguide from the first end portion thereof.

13. The door handle apparatus according to claim 8, further comprising a malfunction detecting portion for detecting a malfunction of at least the informing portion, wherein the malfunction detecting portion is configured by using the operation detecting portion.

* * * * *